United States Patent
Richards et al.

(10) Patent No.: US 11,175,577 B2
(45) Date of Patent: *Nov. 16, 2021

(54) METHODS AND SYSTEMS FOR HIGH DYNAMIC RANGE IMAGE PROJECTORS

(71) Applicant: DOLBY LABORATORIES LICENSING CORPORATION, San Francisco, CA (US)

(72) Inventors: Martin J. Richards, Gig Harbor, WA (US); Nathan Wainwright, Plano, TX (US); Douglas J. Gorny, Pacifica, CA (US); Duane Scott Dewald, Plano, TX (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/516,183

(22) Filed: Jul. 18, 2019

(65) Prior Publication Data

US 2019/0339601 A1    Nov. 7, 2019

Related U.S. Application Data

(63) Continuation of application No. 15/540,980, filed as application No. PCT/IB2015/059957 on Dec. 23, 2015, now Pat. No. 10,386,709.

(Continued)

(51) Int. Cl.
*G03B 21/20* (2006.01)
*H04N 9/31* (2006.01)
(Continued)

(52) U.S. Cl.
CPC ......... *G03B 21/208* (2013.01); *G03B 21/008* (2013.01); *G03B 21/147* (2013.01);
(Continued)

(58) Field of Classification Search
CPC .. G03B 21/208; G03B 21/008; G03B 21/147; G03B 21/2013; G03B 21/206;
(Continued)

(56) References Cited

U.S. PATENT DOCUMENTS 5,822,128 A    10/1998    Atushi
5,978,142 A    11/1999    Geoffrey
(Continued)

FOREIGN PATENT DOCUMENTS

CN    1541483    10/2004
CN    102027747    4/2011
(Continued)

OTHER PUBLICATIONS

Zlotnik A. et al., "Using digital mirror devices and compressive imaging framework to achieve geometric superresolution and field of view extension", Proc. SPIE, vol. 8618, 86180K, Mar. 8, 2013.

*Primary Examiner* — Michelle M Iacoletti
*Assistant Examiner* — Magda Cruz

(57) ABSTRACT

Projection systems and/or methods for efficient use of light by recycling a portion of the light energy for future use are disclosed. In one embodiment, a projection display system is disclosed comprising a light source; an integrating rod that receives light from said light source at a proximal end that comprise a reflective surface which may reflecting/recycle light down said integrating rod; of reflecting light down said integrating rod; a relay optical system, said relay optical system further comprising optical elements that are capable of moving the focal plane of the projector display system; and a modulator comprising at least one moveable mirror that reflects light received from the integrating rod in either a projection direction or a light recycling direction.

20 Claims, 19 Drawing Sheets

Related U.S. Application Data

(60) Provisional application No. 62/142,353, filed on Apr. 2, 2015, provisional application No. 62/099,078, filed on Dec. 31, 2014.

(51) Int. Cl.
  *G03B 21/00* (2006.01)
  *G03B 21/14* (2006.01)
  *G06T 5/00* (2006.01)

(52) U.S. Cl.
  CPC ....... *G03B 21/206* (2013.01); *G03B 21/2013* (2013.01); *G03B 21/2066* (2013.01); *G06T 5/002* (2013.01); *H04N 9/312* (2013.01); *H04N 9/315* (2013.01); *H04N 9/3126* (2013.01); *H04N 9/3182* (2013.01); *G03B 21/204* (2013.01)

(58) Field of Classification Search
  CPC .. G03B 21/2066; G03B 21/204; G06T 5/002; H04N 9/312; H04N 9/3126; H04N 9/315; H04N 9/3182
  See application file for complete search history.

(56) References Cited

U.S. PATENT DOCUMENTS

| | | | |
|---|---|---|---|
| 6,863,401 B2 | 3/2005 | Penn | |
| 7,167,296 B2 | 1/2007 | Daniel | |
| 7,256,841 B2* | 8/2007 | Hibi | H04N 9/315 |
| | | | 348/679 |
| 7,400,439 B2 | 7/2008 | Holman | |
| 7,458,687 B2 | 12/2008 | Silverstein | |
| 7,551,341 B1* | 6/2009 | Ward | G03B 21/26 |
| | | | 359/259 |
| 7,663,795 B2 | 2/2010 | Blackham | |
| 7,683,919 B2 | 3/2010 | Tsunemori | |
| 7,800,683 B2 | 9/2010 | Zeev | |
| 8,125,702 B2 | 2/2012 | John | |
| 8,188,434 B2 | 5/2012 | Ayer | |
| 8,231,228 B2 | 7/2012 | Valter | |
| 8,253,844 B2 | 8/2012 | Michael | |
| 8,319,145 B2 | 11/2012 | Charles | |
| 8,366,275 B2 | 2/2013 | Robert | |
| 8,441,582 B2 | 5/2013 | Koji | |
| 8,542,408 B2 | 9/2013 | Foster | |
| 8,783,874 B1 | 7/2014 | Riza | |
| 2002/0171807 A1* | 11/2002 | Hibi | H04N 9/3194 |
| | | | 352/198 |
| 2003/0142274 A1 | 7/2003 | Gibbon | |
| 2004/0001184 A1 | 1/2004 | Gibbons | |
| 2004/0239883 A1 | 12/2004 | Yoshikawa | |
| 2005/0128441 A1* | 6/2005 | Morgan | G03B 21/2033 |
| | | | 353/102 |
| 2007/0053074 A1* | 3/2007 | Krijn | H04N 5/7458 |
| | | | 359/726 |
| 2008/0158263 A1 | 7/2008 | Sue | |
| 2008/0246705 A1 | 10/2008 | Ian | |
| 2009/0225234 A1 | 9/2009 | Ward | |
| 2009/0284666 A1 | 11/2009 | Benny | |
| 2011/0080471 A1 | 4/2011 | Zhang | |
| 2011/0134280 A1 | 6/2011 | Yih | |
| 2011/0227900 A1 | 9/2011 | Damir | |
| 2011/0279749 A1 | 11/2011 | Gopal | |
| 2012/0038693 A1 | 2/2012 | Michael | |
| 2012/0092360 A1 | 4/2012 | Michael | |
| 2012/0133689 A1 | 5/2012 | Kwong | |
| 2013/0063496 A1 | 3/2013 | Brad | |
| 2013/0106923 A1 | 5/2013 | Shields | |
| 2013/0148037 A1 | 6/2013 | Whitehead | |
| 2013/0321475 A1 | 12/2013 | Michael | |
| 2014/0043352 A1 | 2/2014 | Damberg | |
| 2014/0111867 A1 | 4/2014 | John | |
| 2014/0204134 A1 | 7/2014 | Lawrence | |
| 2014/0267978 A1 | 9/2014 | Simon | |
| 2016/0139560 A1* | 5/2016 | Gorny | G03B 21/2033 |
| | | | 348/40 |
| 2016/0241828 A1* | 8/2016 | Richards | H04N 9/3179 |
| 2016/0261832 A1* | 9/2016 | Gorny | H04N 9/3126 |
| 2018/0024429 A1* | 1/2018 | Dewald | G03B 21/008 |
| | | | 353/81 |
| 2018/0164665 A1* | 6/2018 | Gorny | G03B 21/005 |

FOREIGN PATENT DOCUMENTS

| | | |
|---|---|---|
| JP | 2000171737 | 6/2000 |
| JP | 2002287250 | 10/2002 |
| JP | 2003015102 | 1/2003 |
| JP | 2003121922 | 4/2003 |
| JP | 2004242136 | 8/2004 |
| JP | 2006133750 | 5/2006 |
| JP | 2006317925 | 11/2006 |
| JP | 2007519974 | 7/2007 |
| JP | 2007537484 | 12/2007 |
| JP | 2008052090 | 3/2008 |
| JP | 2009058786 | 3/2009 |
| JP | 2012103642 | 5/2012 |
| JP | 2013168834 | 8/2013 |
| JP | 2014517337 | 7/2014 |
| JP | 2015090497 | 5/2015 |
| WO | 2015054032 | 4/2015 |

* cited by examiner

METHODS AND SYSTEMS FOR HIGH DYNAMIC RANGE IMAGE PROJECTORS

CROSS REFERENCE TO RELATED APPLICATIONS

This application is a continuation of U.S. patent application Ser. No. 15/540,980, filed Jun. 29, 2017, which in turn is the 371 national stage of PCT Application No. PCT/IB2015/059957, filed Dec. 23, 2015, which claims priority to U.S. Patent Application No. 62/142,353, filed on Apr. 2, 2015 and U.S. Provisional Patent Application No. 62/099,078, filed on Dec. 31, 2014, each of which is hereby incorporated by reference in its entirety.

TECHNICAL FIELD

The present invention relates to light recycling for projector systems and, particularly, to systems and methods for High Dynamic Range (HDR) projection systems.

BACKGROUND

Projector systems are now being architected with improvements in dynamic range. Dual and multi-modulator projector display systems are known in the art. However, additional improvements are possible in both the rendering and the performance of such display systems resulting from improved modeling of the light processing in such display systems. In addition, as appreciated by the inventors, it would be desirable to increase the brightness of image highlights for dual/multi-modulation systems and/or the energy performance for single modulation display systems—as well as for dual/multi-modulation display systems.

SUMMARY

Projection systems and/or methods for efficient use of light by recycling a portion of the light energy for future use are disclosed. In one embodiment, a projection display system is disclosed comprising a light source; an integrating rod that receives light from said light source at a proximal end and that comprises a reflective surface which may be reflecting/recycle light down said integrating rod; and a modulator comprising at least one moveable mirror that reflects light received from the integrating rod in either a projection direction or a light recycling direction. In other embodiments, dual and multiple modulator projector display systems are disclosed. A first modulator may affect either a pre-modulated halftone image or may affect a highlights modulated image for a desired image to be displayed. A second modulator may be provided for primary modulation of a desired image.

In one embodiment, a projector display system capable of recycling light from a light source, said projector display system is disclosed comprising: a light source; an integrating rod, said integrating rod configured to receive light from said light source at a proximal end and wherein said proximal end comprises a reflective surface capable of reflecting light down said integrating rod; of reflecting light down said integrating rod; a relay optical system, said relay optical system further comprising optical elements that are capable of moving the focal plane of the projector display system; and a modulator, said modulator comprising a moveable mirror, such moveable mirror capable of reflecting light received from said integrating rod in at least one of a projection direction and a light recycling direction wherein said light recycling direction is substantially in the direction of the integrating rod.

Embodiments for controlling light-recycling in response to image characteristics are also presented.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1A:
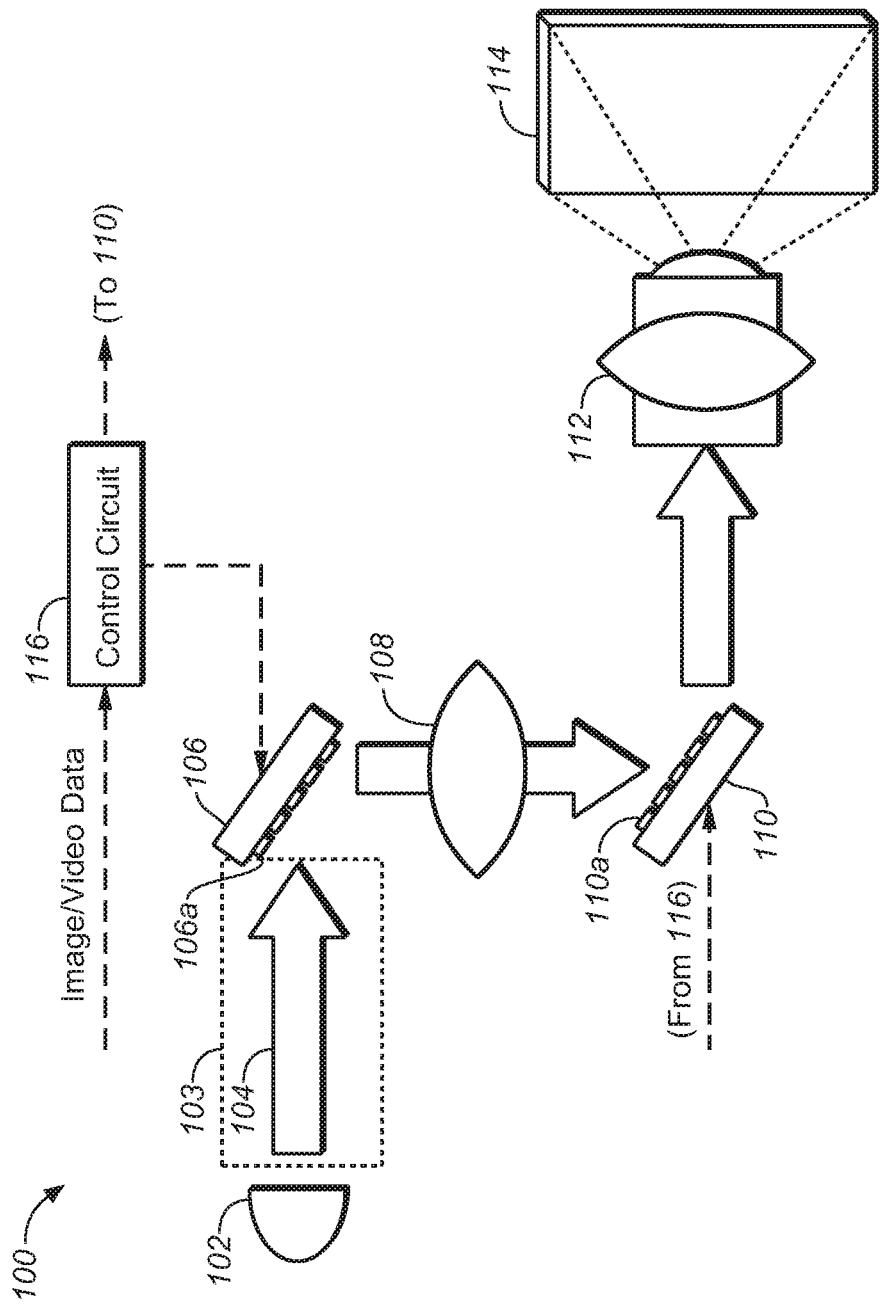
FIG. 1A depicts a dual modulator projector display system with a light recycling module shown schematically and as made in accordance with the principles of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

INTRODUCTION

In the field of projector and other display systems, it is desirable to improve both image rendering performance and system efficiency. Several embodiments of the present application describe systems, method and techniques to affect these improvements by employing light field modeling for dual, or multi-modulation display systems. In one embodiment, light source models are developed and used to advantageous effect. Camera pictures of displayed images of known input images may be evaluated to improve light models. In some embodiments, an iterative process may accumulate improvements. In some embodiments, these techniques may be used on moving images to make live adjustments to improve image rendering performance.

Dual modulation projector and display systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";

(2) United States Patent Application 20130148037 to Whitehead et al., published on Jun. 13, 2013 and entitled "PROJECTION DISPLAYS";

(3) United States Patent Application 20110227900 to Wallener, published on Sep. 22, 2011 and entitled "CUSTOM PSFs USING CLUSTERED LIGHT SOURCES";

(4) United States Patent Application 20130106923 to Shields et al., published on May 2, 2013 and entitled "SYSTEMS AND METHODS FOR ACCURATELY REPRESENTING HIGH CONTRAST IMAGERY ON HIGH DYNAMIC RANGE DISPLAY SYSTEMS";

(5) United States Patent Application 20110279749 to Erinjippurath et al., published on Nov. 17, 2011 and entitled "HIGH DYNAMIC RANGE DISPLAYS USING FILTERLESS LCD(S) FOR INCREASING CONTRAST AND RESOLUTION" and (6) United States Patent Application 20120133689 to Kwong, published on May 31, 2012 and entitled "REFLECTORS WITH SPATIALLY VARYING REFLECTANCE/ABSORPTION GRADIENTS FOR COLOR AND LUMINANCE COMPENSATION".

all of which are hereby incorporated by reference in their entirety.

One Exemplary Physical Architecture

In general, a projector with a single Digital Micromirror Device (DMD) may tend to have a limited contrast ratio. To obtain a greater contrast ratio, two or more DMDs and/or other reflectors (e.g., MicroElectroMechanical Systems (MEMS)) may be arranged in series. As a DMD may operate as a time-division or pulse-width modulator, operating two or more DMDs and/or reflectors in series—both acting as pulse-width modulators—tends to require precise time-division alignment and pixel-to-pixel correspondence of time-division sequencing. Such alignment and correspondence requirements may be difficult in practice. Thus, in many embodiments of the present application, projector and/or display systems may employ different dual-modulation schemes to affect the desired performance.

For merely one example, one embodiment of a projector display system may use the first modulator (e.g., a first DMD/reflector) as a "pre-modulator" or "premod"—that may spatially modulate a light source by means of a halftone image that may be maintained for a desired period of time (e.g., a frame or a portion thereof). This halftone image may be blurred to create a spatially-reduced-bandwidth light field that may be applied to a second DMD/reflector. The second DMD/reflector—referred to as the primary modulator—may pulse-width modulate the blurred light field. This arrangement may tend to avoid both requirements mentioned above—e.g., the precise time-division alignment and/or the pixel-to-pixel correspondence. In some embodiments, the two or more DMDs/reflectors may be frame-aligned in time, and approximately spatially frame-aligned. In some embodiments, the blurred light field from the premod DMD/reflector may substantially overlap the primary DMD/reflector. In other embodiments, the spatial alignment may be known and accounted for—e.g., to aid in image rendering performance.

While the present application is presented in the context of a dual, multi-modulation projection system, it should be appreciated that the techniques and methods of the present application will find application in single modulation, or other dual, multi-modulation display systems. For example, a dual modulation display system comprising a backlight, a first modulator (e.g., LCD or the like), and a second modulator (e.g., LCD or the like) may employ suitable blurring optical components and image processing methods and techniques to affect the performance and efficiencies discussed herein in the context of the projection systems.

It should also be appreciated that—even though FIG. 1A depicts a two-stage or dual modulator display system—the methods and techniques of the present application may also find application in a display system with only one modulator or a display system with three or more modulator (multi-modulator) display systems. The scope of the present application encompasses these various alternative embodiments.

FIG. 1A shows one possible embodiment of a dual/multi-modulator projector display system 100 that may suffice for the purposes of the present application. Projector system 100 employs a light source 102 that supplies the projector system with a desired illumination such that a final projected image will be sufficiently bright for the intended viewers of the projected image. Light source 102 may comprise any suitable light source possible—including, but not limited to: Xenon lamp, laser(s), coherent light source, partially coherent light sources. As the light source is a major draw of power and/or energy for the entire projector system, it may be desirable to advantageously use and/or re-use the light, so as to conserve the power and/or energy during the course of its operation.

Light 104 may illuminate a first modulator 106 that may, in turn, illuminate a second modulator 110, via a set of optional optical components 108. Light from second modulator 110 may be projected by a projection lens 112 (or other suitable optical components) to form a final projected image upon a screen 114. First and second modulators may be controlled by a controller 116—which may receive input image and/or video data. Controller 116 may perform certain image processing algorithms, gamut mapping algorithms or other such suitable processing upon the input image/video data and output control/data signals to first and second modulators in order to achieve a desired final projected image 114. In addition, in some projector systems, it may be possible, depending on the light source, to modulate light source 102 (control line not shown) in order to achieve additional control of the image quality of the final projected image.

Light recycling module 103 is depicted in FIG. 1A as a dotted box that may be placed in the light path from the light source 102 to the first modulator 106, as will be discussed below. While the present discussion will be given in the context of this positioning, it will be appreciated that light recycling may be inserted into the projector system at various points in the projector system. For example, light recycling may be placed between the first and second modulators. In addition, light recycling may be placed at more than one point in the optical path of the display system. While such embodiments may be more expensive due to an increase in the number of components, that increase may be balanced off against the energy cost savings as a result of multiple points of light recycling.

Figure 1B:
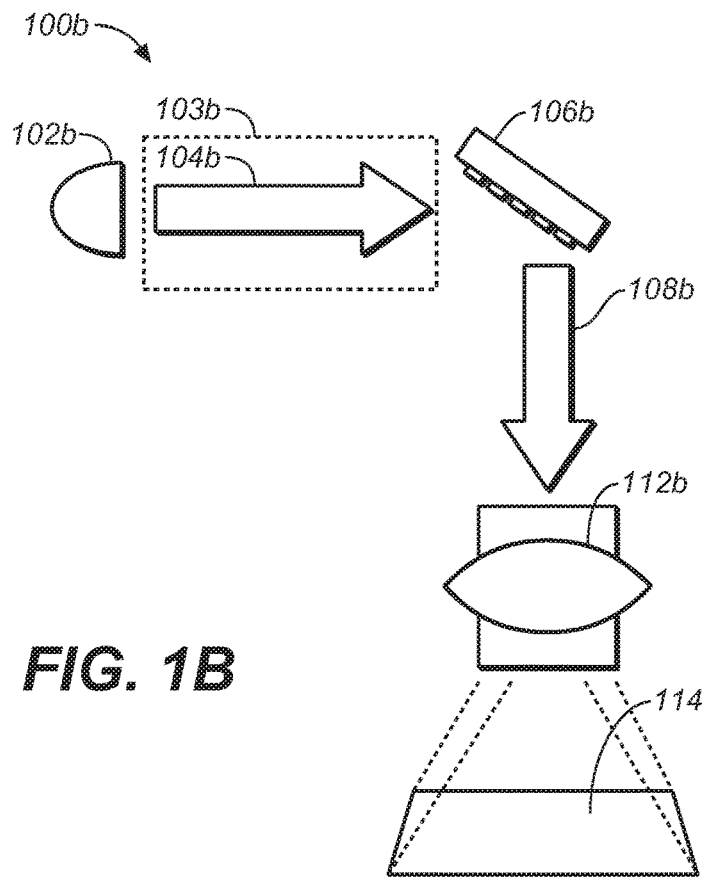
FIG. 1B depicts a single modulation projector display system with a light recycling module shown schematically and as made in accordance with the principles of the present application.

FIG. 1B depicts one embodiment of a projector display system 100b that comprises a single modulator 106b. Light source 102b emits (possibly under controller control—not shown) a light beam 104b may be transmitted through a light recycling module 103b, as before. Modulator 106b may selectively reflect the light, as desired by controller—and modulated light 108b may be transmitted through projector optics 112b and projected onto screen 114 as a finally desired image to be viewed.

Figure 1C:
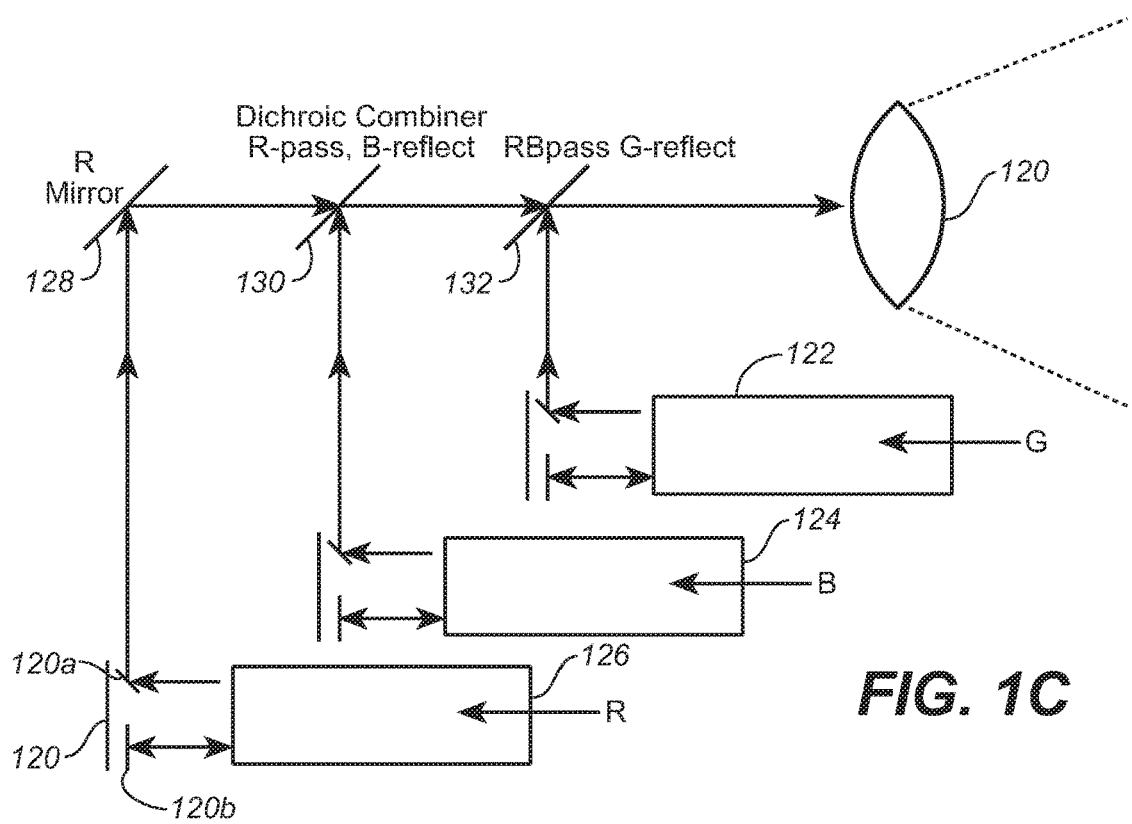
FIG. 1C depicts a projector display system that comprises light recycling modules on a plurality of color channels.

FIG. 1C depicts one embodiment of a light recycling module that may perform light recycling on a plurality of color laser channels (e.g., R, G, and B). As may be seen in this example, the display system may comprise a red light source (R) that enters into an integrating rod 126 (e.g., 124 for B and 122 for G) that may be transmitted (possibly via total internal reflectance) to a controllable reflector 120 that may comprise one or more reflectors that may exhibit a recycle position 120b or a transmit position 120a. If light is to be recycled, reflector 120b would reflect the laser light back into the integrating rod 126—which may reflect within that path multiple times—until the reflector is commanded (via controller, not shown) to transmit position 120a. Light transmitted by reflector 120a may be directed to a red mirror 128 as shown. In the case of blue light, blue light may be combined with red light at dichroic combiner 130. Similarly, green light may be thereafter combined as dichroic combiner 132 and the light may then be further modulated and/or projected—as simply depicted by optical element 120. It will be appreciated that this light recycling module may suffice for the purposes of a single modulator, dual modulator and/or multiple modulator display systems as desired.

One Light Recycling Embodiment

Figure 2:
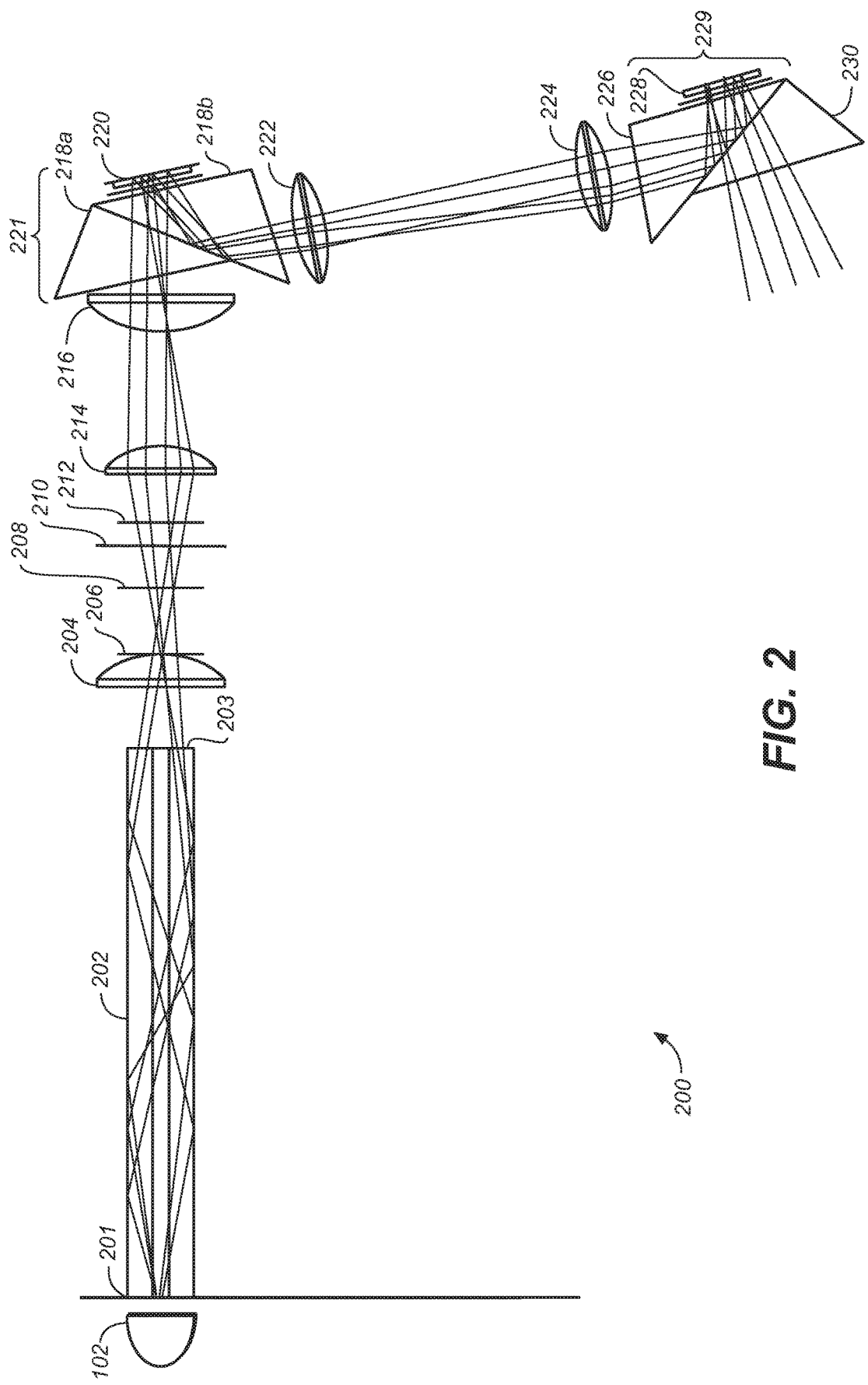
FIG. 2 depicts one embodiment of a light recycling module that suffices for the purposes of the present application.
Figure 3:
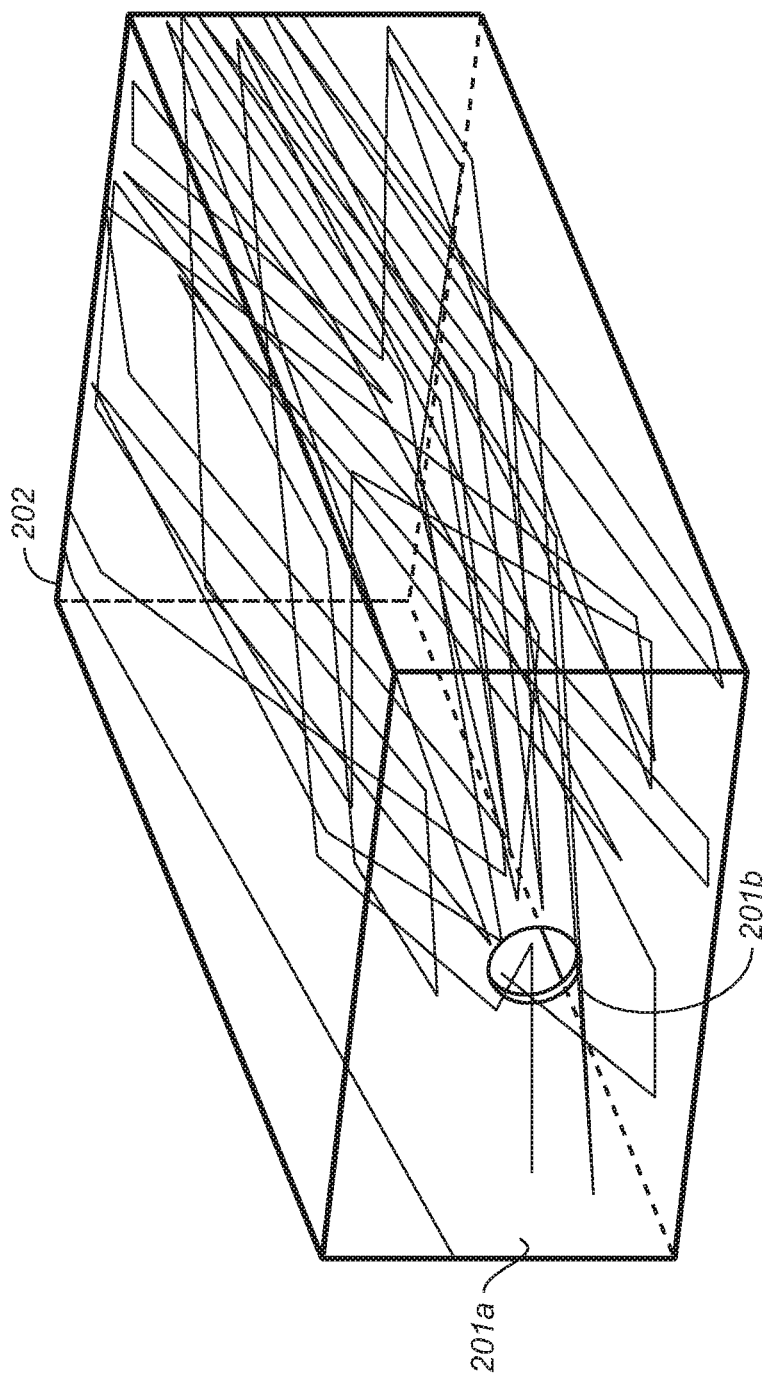
FIG. 3 shows the proximal end of an integrating rod suitable for the purposes of the present application.

FIG. 2 depicts one embodiment of a light recycling subsystem and/or module, as may be suitable for the purposes of the present application. As discussed above, this light recycling subsystem/module may be placed in the projector system primarily between the light source 102 and a first modulator 221. Light from light source 102 may be input to the optical path via an integrating rod/tube/box 202 (e.g., via a port 201b, as seen in FIG. 3). Integrating rod/tube/box 202 may comprise a substantially reflected surface in its interior, so that light that is incident on its surface may be reflected (e.g., possibly multiple times) until the light is exits its extreme right end 203. Once the light exits the integrating rod/tube/box, the light may be placed into an optical path that is defined by a set of optical elements—e.g., lens 204, 214 and 216 and a set of filters and/or polarizers 208, 210 and 212.

First modulator 221 may comprise a number of prisms 218a, 218b and a reflector 220. Reflector 220 may comprise a DMD array of reflectors, or a MEMS array—or any other suitable set of reflectors possible that may reflect light in at least two or more paths. One such path is depicted in FIG. 2. As may be seen, reflectors 220 direct the light onto the interface of prisms 218a and 218b, such that the light is thereby reflected into lens assembly 222 and thereafter to second modulator 229 (e.g., comprising lens assembly 224, prisms 226 and 230 and reflector 228). This light may be employed to form the finally projected image to be viewed by an audience.

However, at certain time during the rendering of the final projected image, the full power/energy of the light source 102 may not be needed. If it is not possible to modulate the power of light source 102 (or if it is difficult or if there is additional opportunity to conserve light), then it may be desired to recycle the light from light source 102. In this case, and as may be seen in FIG. 2, it may be possible to align reflector 220 from its current position as shown (i.e., where the light is directed to travel the path down to the second modulator—to position instead where the light would be substantially reflected back to the integrating rod/tube/box 202, along substantially the same path as described as traveling from right-to-left direction. In one embodiment, a recycling system may be able to make parts of the image brighter. This may be desirable in circumstances where large parts of the screen are dark and some parts are very bright.

In another embodiment, a third (optional) path (not shown) allows the reflectors to direct light from the light source to a light "dump"—i.e., a portion of the projector system where the light is absorbed. In this case, the light is wasted as heat to be dissipated from the projector system.

Thus, the projector system may have multiple degrees of freedom when it comes to directing the light as desired.

FIG. 3 shows one embodiment of the proximal end 201 (i.e., the end closest to the light source) that aids in affecting light recycling. As may be seen, light may travel through integrating rod/tube/box 202 (e.g., via multiple reflections) back to the proximal end 201. Proximal end 201 may further comprise a back portion 201a—which may further comprise a reflecting surface—and a port opening 201b where light from light source 102 may be input into the projector system. Light impacting the back portion 201a may be reflected back down the integrating rod 202 (possibly multiple times until the reflector(s) at the first modulator are directed to transmit the light down to a second modulator or some other suitable optical path to form the final image). The examples of FIGS. 2 and 3 may be considered one example of a light recycling module that (like other examples given herein) are capable of recycling light at some point in the light pathway through the display system.

Figure 14:
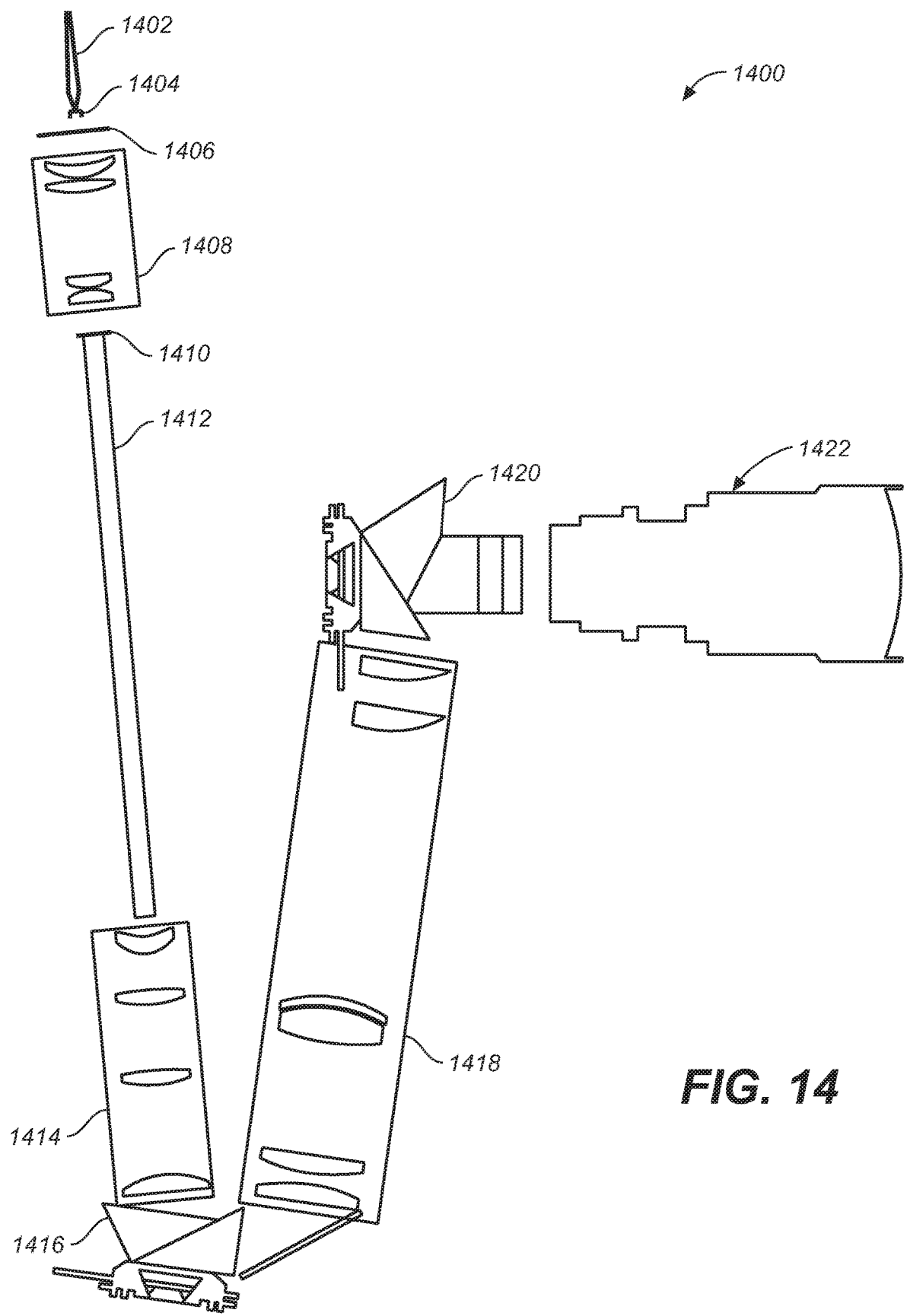
FIG. 14 depicts one alternative embodiment of a light recycling module in a dual modulator display system.

FIG. 14 is yet another embodiment of a light recycling module 1400—which may serve a module for at least one laser and/or partially coherent colored light source 1402, 1404, 1406. Light from such a source may transmit through a first optical subsystem 1408 to condition the light to be input into integrating rod 1412—which may comprise the reflecting proximal end 1410, such as in FIG. 3. A second optical subsystem 1414 may further condition the light as desired prior to input into a first modulator 1416. As with FIGS. 2 and 3 above, this first leg of the module 1400 may affect a light recycling mode, as discussed.

After first modulation, light may be transmitted through a third optical subsystem 1418 prior to input into a second modulator 1420—which modulates the light for transmission through a projector optical subsystem 1422 to project a final image for viewing.

Highlight Embodiments

In one embodiment, an optional highlights modulator may affect adjustable illumination with a fraction of the available light, unless it is combined with the pre-modulator. To accomplish this, both mechanical and/or non-mechanical subsystems and techniques of beam steering may be employed—e.g., steering portions of the illumination source to the various paths in the system using mechanical steering, holograms with spatial light modulators or other spatial modulation methods may be possible. It may be desired with such a system to increase efficiency by steering light to where it is desired.

Mechanical beam steering may use a collection of reflective elements which can be controlled over a range of motion in the horizontal and/or vertical direction. These reflective elements direct the light reaching them to the desired areas of the modulators following the highlight modulator creating controlled non-uniform illumination.

Non-mechanical beam steering methods may use a spatial light modulator to shift the phase of uniform coherent light reaching the modulator. The phase shifted light creates a three dimensional light field when imaged through a lens. The three dimensional light field can be imaged into a two dimensional light field with different planes from the collapsed dimension imaging with varying sharpness or PSF properties onto one of the following modulators creating a two dimensional light field.

Without regard to the manner of implementation, highlights modulation refers to using a modulator to steer light reaching it to anywhere on the subsequent modulators. While there can be restrictions, such as positional range and granularity, the term "anywhere" may still be used to distinguish highlight modulators from other modulators.

Depending on the number of highlight modulation elements, PSF properties and total coverage achievable by the highlights modulator, it may not be necessary in some embodiments to have a pre-mod/first modulator between it and the primary/second modulator. In some embodiments, it may be possible that the highlight modulator may be of such performance as to not require any modulation (pre or primary) after it.

Highlights to Pre/Prime Relay Optics Control

In some embodiments, it may be possible to adjust the relay optics to control the Point Spread Function shapes of illumination on to the pre-mod/first modulator or primary/second modulator generated by a highlights modulator. In some embodiments, there may be controls to adjust the Full Width Half Max dimension as well as to control the shape or tails of the PSFs. It may be desirable to predict, monitor and/or measure the resulting performance when light recycling is employed as additional passes through the integrating rod will change the uniformity and angular diversity of the light which will in turn affect the resulting PSFs.

Pre-Mod/First Modulation Embodiments

In some embodiments, Pre-mod/first modulation may entail the ability to modulate the light arriving at the pre-modulator on the way to the primary modulator. In some cases, pre-modulation may be employed to increase the system contrast. With highlighting, it is possible that the highlight image may illuminate the pre-modulator in addition to the non-imaged pre-modulator illumination.

In some embodiments, a suitable pre-mod/first modulator may be a DMD, an LCD, LCoS (Liquid Crystal On Silicon) or other intensity modulator. Regardless of the implementation, pre-modulation may be used to modulate the light intensity reaching it on to the following modulators. The pre modulator elements (e.g., mirrors, pixels, etc.) each influence a fixed location on the following modulators, or screen if no additional modulation follows the pre modulator. Depending on the number of pre modulation elements, PSF properties and total coverage achievable by a pre-modulator, it may not be necessary to have a primary modulator follow it. It is possible that the pre modulator could be of such performance as to not require any modulation (e.g., highlight or primary) before or after it.

Pre to Primary Modulator Relay Optics Control

This refers to the ability to adjust the relay optics to control the Point Spread Function shapes of illumination on to the Primary modulator generated by the Highlights or Pre modulator. There are controls to adjust the Full Width Half Max dimension as well as to control the shape or tails of the PSFs. It is possible to use recycling with the pre-modulator, and it may be desirable monitor, model, predict and/or measure the resulting illumination intensity as additional passes through the integrating rod will change the uniformity and angular diversity of the light which will in turn affect the resulting PSFs.

Primary Modulator Embodiments

Primary/second modulation may entail the ability to modulate the light arriving at the primary modulator on the way to the screen. In some embodiments, this may tend to ensure a resulting quality image with high contrast, and desired spatial and intensity resolution. In some embodiments, it may be possible that the highlight and/or pre modulator images may illuminate the primary modulator, in addition to the non-imaged primary modulator illumination.

In some embodiments, a suitable primary/second modulator may be a DMD, an LCD, LCoS or other intensity modulator. Regardless of the manner of implementation, primary/second modulation may serve to modulate the light intensity reaching it on to the screen. The primary modulator elements (e.g., mirrors, pixels, etc.) each influence a fixed location on the screen. The size and shape of each location should be consistent to form the projected screen image whose overall size and shape will be determined by the Projection Optics. Depending on the primary modulator contrast range, it might not be necessary to use a highlight or pre-modulator. It is possible that the primary modulator may be of such performance as to not require any modulation (highlight or pre) before it. It may be possible to use recycling with the primary modulator. It would be desirable to understand the resulting illumination intensity both in level and over time in order to compensate with illumination adjustment or by changing the signal to the modulator to ensure the desired image is formed. It is possible to measure this level. It is also possible to model and predict this level algorithmically.

Other Projector System Embodiments

Figure 4:
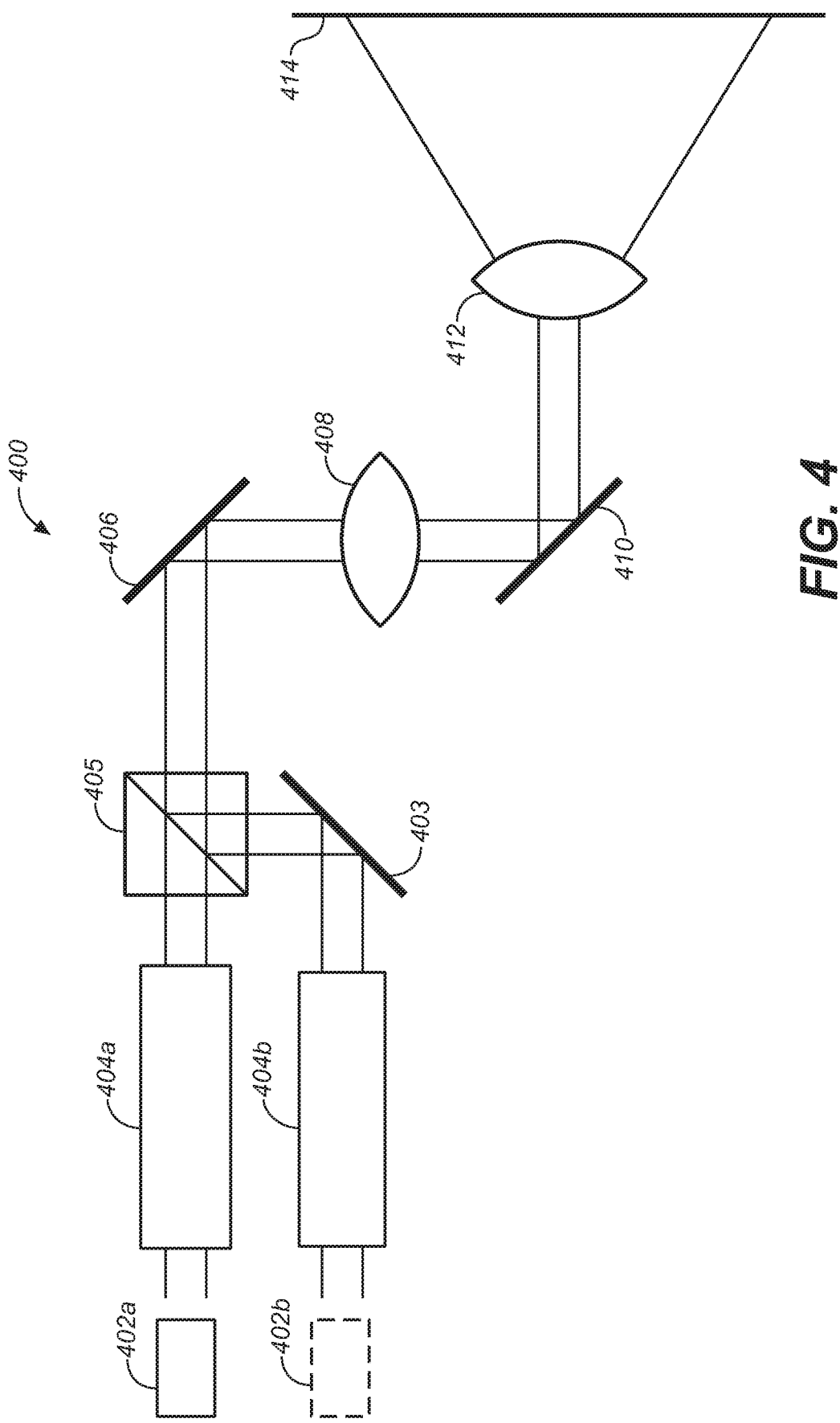
FIG. 4 depicts another embodiment of a dual/multi-modulator projector system where it may be possible and/or desirable to perform light recycling in accordance with the principles of the present application.

FIG. 4 depicts another embodiment of a dual/multi-modulator projector system 400 where it may be possible and/or desirable to perform light recycling. As may be seen, projector system 400 may comprise one or more light sources (e.g., 402a and/or 402b, or other additional light sources). In this embodiment, the light source 402a provides light into an integrated subsystem/box 404a that may resemble the embodiment of FIG. 2A. Light from 402a may eventually make it to first modulator 406—where first modulator 406 may be constructed in substantially the same way as FIGS. 1A, 1B, 1C and/or 2 (i.e., with reflectors that may reflect the light back into integrating subsystem/box 404a. The light may then proceed to optical subsystem 408, second modulator 410 and thereafter to projector lens 412 and a final projected image may be formed on screen 414.

However, another opportunity for light recycling may occur with another one (or more, in other embodiments) light source 402b. In one embodiment, light source 402b may be employed as another primary light source (i.e. to provide a significant amount of light for final images a substantial amount of the time). In this embodiment, light from 402b may be further reflected by reflector 403 such that this light may be combined with the light from 402a at beam splitter 405—and the combined beam forms the final image a substantial amount of the time.

In another embodiment, light source 402b may be used a lesser amount of the time in order to provide highlight illumination within part of the image. It should be appreciated that reflector 403 may be a single mirror that is possible moveable (e.g. to take light to a dump or another recycling subsystem). Alternatively, reflector 403 may be a set and/or an array of reflectors (e.g., MEMS, DMD or the like) to provide a finer control of the additional light from 402b.

In yet another embodiment, light source 402b may be optional and integrating subsystem/box 404b may have a fully reflective surface at the end proximal to where light source 402b might be. In this embodiment, light may have another path (e.g. inside box 404b, as well as box 404a) in which to recycle light. In another embodiment, it might be possible to use a one way mirror for 405. In this case, reflector 403 would just be a controllable mirror that may redirect the light into 404b and, thus, reflector 403 may only be necessary to "fold" the system for recycling. In such an embodiment, there may be no need to have light recycled in 404a but instead light may be recycled in 404b. This may be desirable as the recycling reflector which may not have hole in it for the light input making it a much more efficient recycler.

Figure 5:
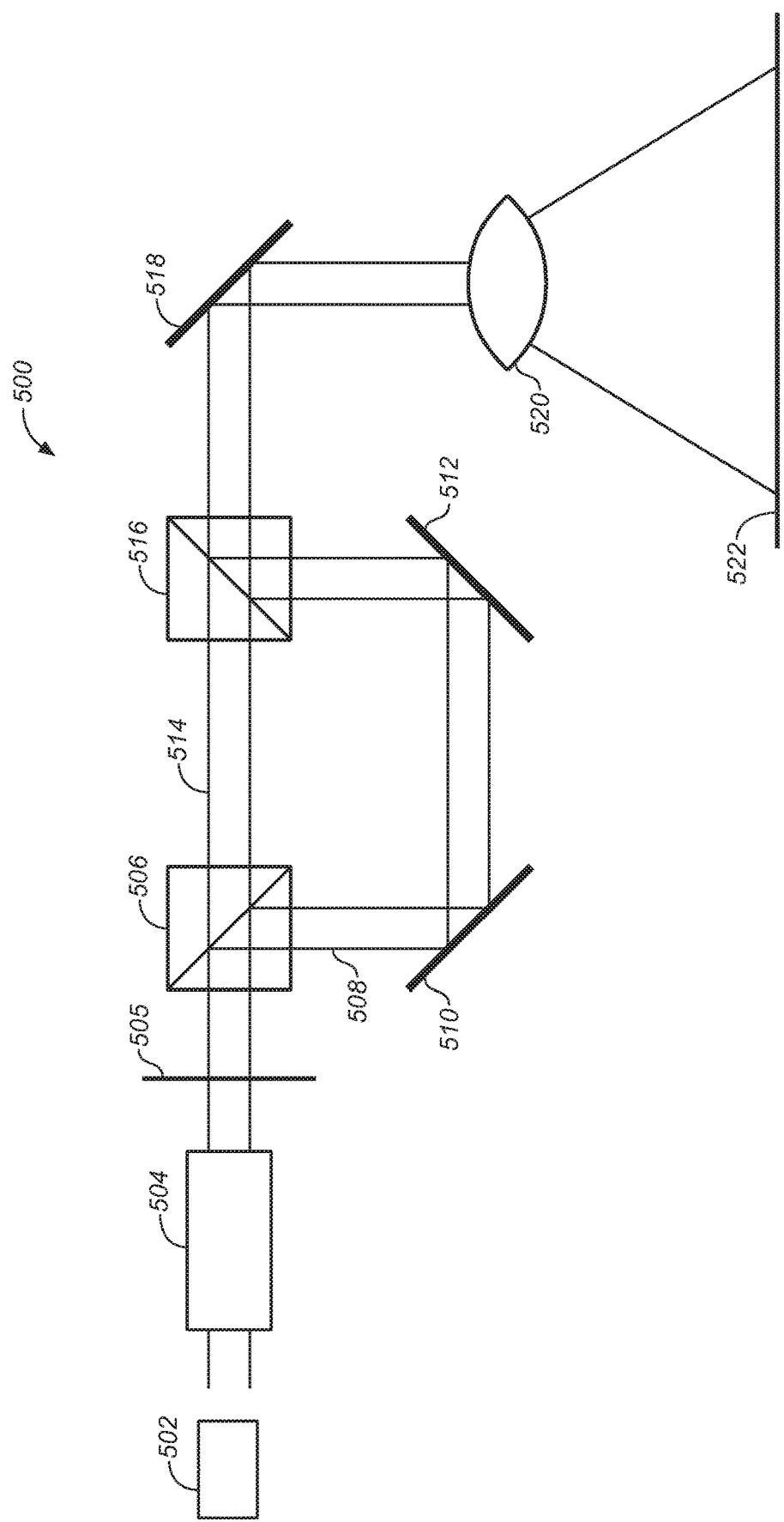
FIG. 5 depicts yet another embodiment of a projector system where light recycling may be possible and/or desirable in accordance with the principles of the present application.

FIG. 5 is yet another embodiment for which light recycling may be possible and/or desirable. Projector system 500 may comprise a light source 502 and integrating subsystem/box 504 as previously described. Polarizer 505 may be a controllable polarizer such as an LCD which will polarize a selectable portion of the light in one orientation. Beam splitter 506 may be a polarizing beam splitter which will let the light in one orientation pass straight through as uniform light field 514 to get combined using 516 onto primary modulator 518. The light polarized in the other orientation gets redirected by 506 as 508. Mirror 510 may be a mirror to fold the system and get light to either a pre-modulator or a highlights modulator 512, depending on the design of the system.

The non-uniform light field from 512 then gets combined with 514 using 516 to illuminate 518. When 512 is a pre modulator, beam 514 may be used to provide some base level of illumination less than the first step of 512 out of dark for very dark portions of the image 522. Alternatively, when 512 is a highlight modulator, 514 is used to provide the uniform light level required by image 522 in regions where no light will be in the non-uniform light field created by 512.

In other embodiments, it may be possible to place a recycling-type integrating rod (similar to those described in FIG. 3) in between 510 and 512 (or in between 506 and 510) and a non-recycling version of an integrating rod (e.g., without a back reflector) in between 506 and 516. In such an embodiment, it may be desired to remove 504 after 502 in order to keep the light as a tight beam.

One Schematic Embodiment

Figure 6A:
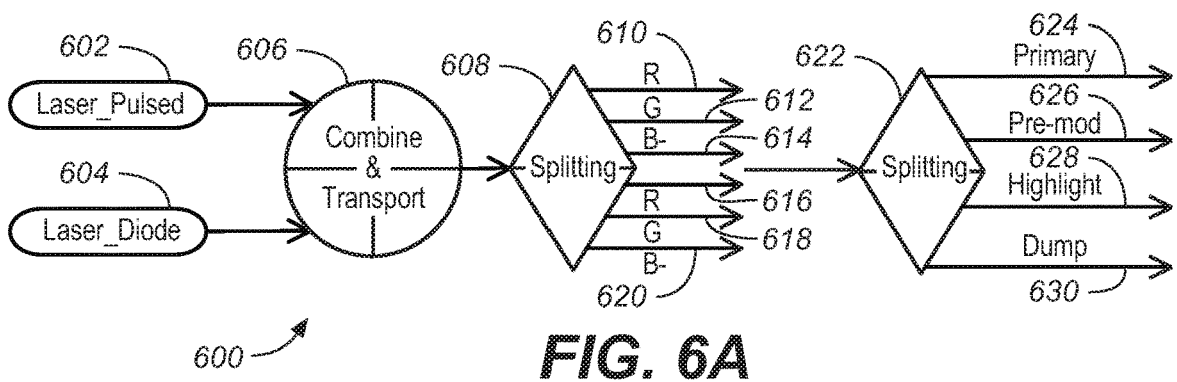
FIGS. 6A and 6B depict schematically many possible embodiments for projector systems that may afford these one or multiple opportunities for light recycling in accordance with the principles of the present application.
Figure 6B:
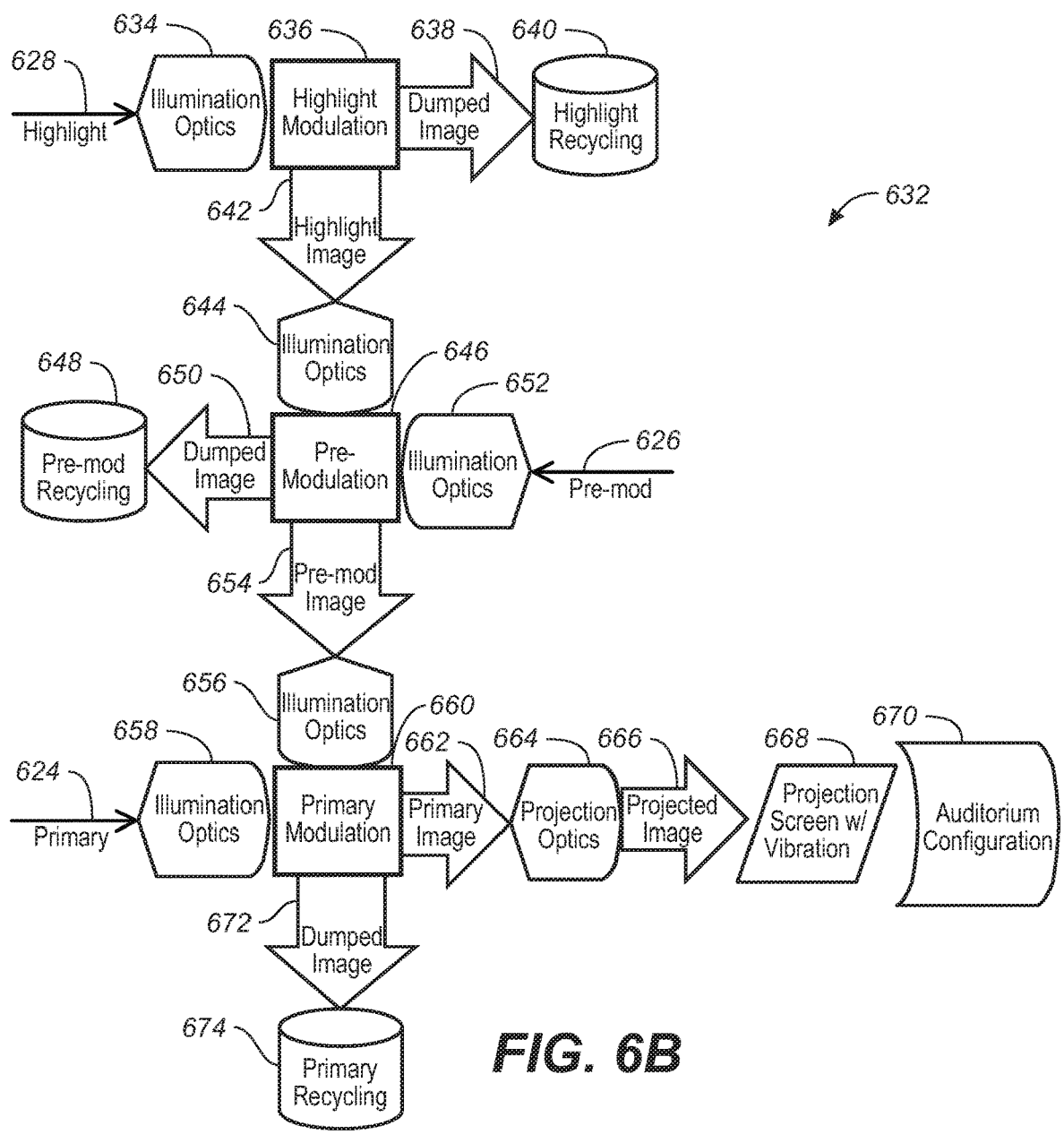

FIGS. 6A and 6B depict schematically one or more possible embodiments for projector systems that may afford these multiple opportunities for light recycling. FIG. 6A depicts schematically the processing 600 that may be possible with a dual/multi-modulator projector system. This processing may include light from a variety of laser, coherent or partially coherent light sources—e.g., where laser light may be pulsed (602) or supplied by laser diodes 604. Such light may be combined and transported (606) in a variety of architectures and manners (as described in connection with several of the embodiments above). Light may then be split (608) into component parts (e.g., 610 through 620) and this light may be combined and split (622) to serve various functions, such as highlight illumination (628), dump illumination (630), pre-mod (or first modulator) illumination (626) and primary (or second modulator) illumination (624).

In one embodiment, adjusting the laser power tends to affect the entire display area uniformly for global dimming. This may be appropriate for some images and scenes in projector systems where it is possible to adjust the laser and/or light source power. However, in some circumstances, it may be advantageous at low luminance levels to have a controllable base level uniform illumination applied directly to the highlights, pre-mod/first modulator or primary/second modulators. Controlling this type of laser power adjustment will be considered another form of global dimming.

In one embodiment employing multiple laser sources (either an individual laser or group of lasers for each controllable source, or by splitting lasers or groups of lasers into each controllable source) in the display system, it may be possible to spatially arrange them such that each one affects a portion of the display area allowing for local dimming. This method is different from the highlights modulator in that these local dimming zones are fixed spatially, where the highlights modulation local dimming zones can be spatially adjustable. It is possible to use mechanical light steering to control the laser power adjustment to each zone by directing the light reaching the mirror to a spatially oriented fiber or optical component such as a segmented integrating rod which will direct the light to a predetermined spatial zone on the modulator.

In such a case, the mechanical light steering device may be considered part of the laser power adjustment and not a highlights and/or pre modulator, however these systems where the number of individually controllable elements on the mechanical steering is greater than the number of spatial zones have the additional advantage of being able to spatially redistribute the illumination from a fixed or variable source rather than having to directly vary the source of each zone. The spatial application of the laser illumination to the modulators may be controlled by the illumination optics for each modulator. For global dimming, illumination by the illumination optics (e.g., lenses, integrating rods, etc.) may be designed to uniformly illuminate the modulator. For local dimming, illumination by the illumination optics (e.g., lenslet arrays, segmented integrating rods, etc.) may be designed to take each light path and spread it across a desired portion of the modulator to create the appropriate PSF.

In an embodiment where the pre-mod/first modulator is anticipated to receive the majority of the illumination, if light recycling is implemented, then it may be desirable to have its illumination adjustable either in splitting or with laser power control, or by using the modulators to compensate which may reduce contrast.

Several Schematic Embodiments

FIG. 6B depicts several embodiments schematically of projector systems that may affect such processing as noted in FIG. 6A. System 632 may optionally provide for highlight illumination 628 to enter into an optical path 634 to a highlight modulator 636. This light may be either sent into the pre-mod (or first modulator) light path at 642 via optical path 644—or the light may be dumped (638) and possibly recycled at 640.

The pre-mod/first modulator stage may input light at 626 via optical path 652. This light may be combined with highlight illumination at the pre-mod/first modulator 646, as described. This light may be either sent to the primary/second modulator (e.g., forming a pre-mod image 654)—or it may be dumped and recycled at 648.

The primary/second modulator (660) may receive light from the pre-mod/first modulator or primary illumination 624 (e.g. via optical paths 656, 658 respectively). This light may be sent as a primary image 662 to projection optics 664, forming projected image 666 onto a projection screen (possibly with vibration, if the light source is coherent or partially coherent) 668 and viewed in an auditorium 670 or the like. Otherwise, the light may be dumped and recycled at 674.

It will be appreciated that this schematic diagram may support a variety of possible projector systems and that all of them are encompassed in the scope of this present application. It may suffice that a projector system architecture may support one or more opportunities for light recycling for the purposes of the present application.

Control Algorithms Embodiments

As mentioned, in many times during the projection of an image, a set of images or video, it may not be desired to use the full power of the light source to form the final projected image. In this case, a portion of the light may be recycled many times (substantially indefinitely) until it is needed to form a more luminant image. In addition, as reflector 220 may actually comprise a set (or array) of reflectors, the opportunity to recycle light may be possible on a local dimming basis. In one possible embodiment, it may be possible to employ light recycling—on either a global or local dimming basis—when not all the available light is needed to form the final projected image—and then use it on a targeted basis, e.g., to project a "highlight" in the final projected image. A highlight may be a portion of the image for which it is desired to direct a good deal more luminant energy than its surrounding part of the image in order to accentuate that portion.

In another embodiment, it may be possible to employ light recycling—again on either a global or local dimming basis—in order to boost luminance of an image or scene that is, on average, a brighter image or scene than the one preceding it. These opportunities may arise during illumination of the pre-mod/first modulator stage, or primary/second modulator stage—as may be seen in FIG. 6B.

In one embodiment, the projector system may make a determination as to how best to employ light recycling through the controller as it processes input image/video data. The decision to recycle may be made either on-the-fly as the image data is processed—or in advance, in a look-ahead fashion by a frame, set of frames or scene-by-scene basis. In another embodiment, whole video and/or scenes may be analyzed off-line and the control signals may be sent to the controller as part of an associated metadata stream, together with the image/video data.

Figure 7A:
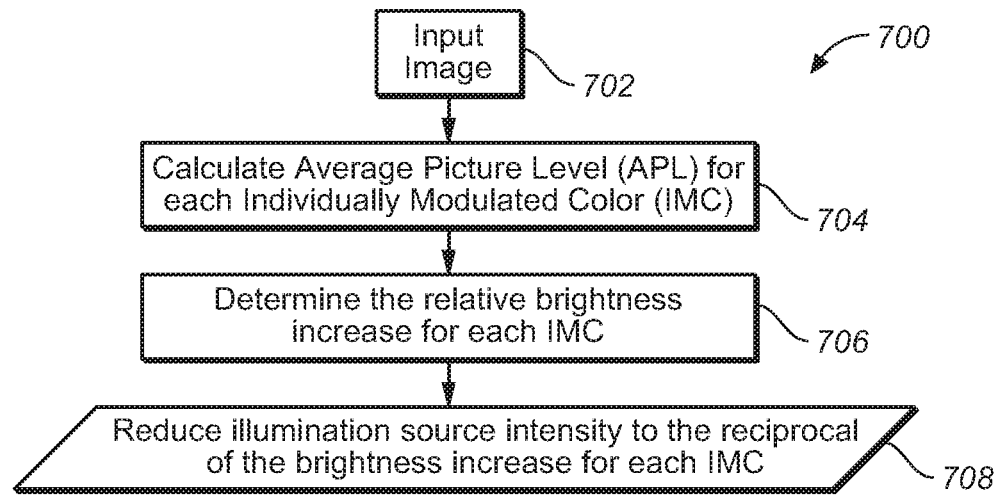
FIG. 7A is one possible light recycling control system and/or method for a single modulation projector display system.

FIG. 7A is one embodiment of a flowchart for performing light recycling.

Figure 7B:
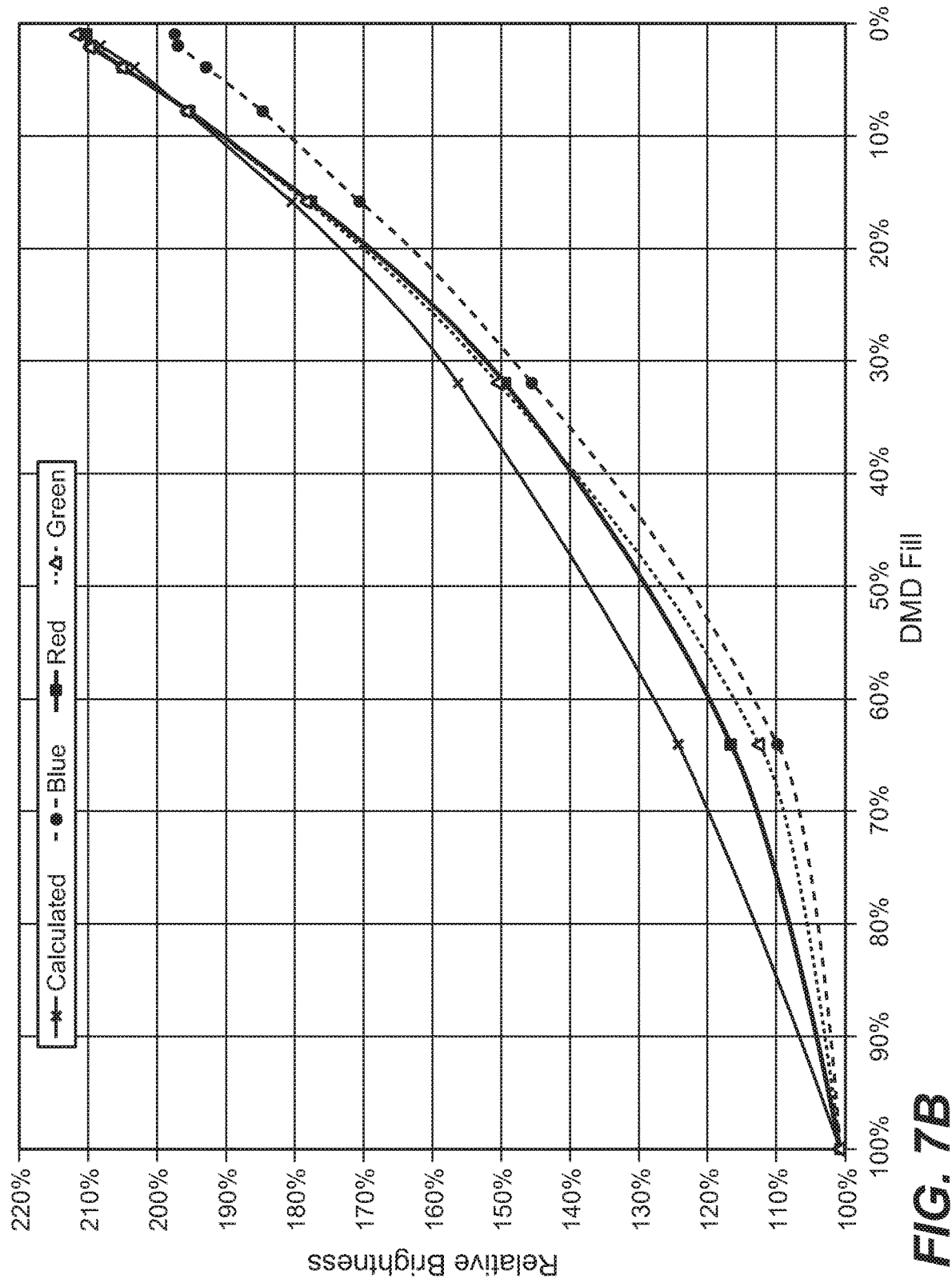
FIGS. 7B and 7C depict the response curves and response table, respectively, for individual modulated color response for a conventional DMD component.

Control system/method 700 may input image data at 702. Based on the response curve and/or table (e.g., as shown in FIG. 7B), the system/method may calculate the Average Picture Level (APL) for each Individually Modulated Color (IMC) of the modulator. As may be seen in the graph of FIG. 7B, each individual color may exhibit a different relative brightness for a given DMD fill percentage. It may be desirable to take into consideration these color difference when performing light recycling—so as to eliminate and/or mitigate any tonal visual artifacts. It should be appreciated that the flowcharts of FIGS. 7A and 8 may assume the recycling generates a uniform field of light—whereas the flowchart of FIG. 9 may account for spatial intensity variation due to the recycling and employ the tables in FIGS. 7C and 10. For example, according to the Table depicted in FIG. 7C, an input image may be divided into a 5×4 array of image regions, and light recycling in each of the image regions may be adjusted as noted, from 0% to 40%.

Returning to FIG. 7A, at 706, the system/method may determine the relative brightness increase for each IMC. Once accomplished, system/method may instruct the display system to reduce the illumination source intensity to the reciprocal of the brightness increase for each IMC. It should be appreciated that other functional relationships may be possible and/or desirable between illumination source intensity and brightness increase—e.g., possibly some inverse relationship of some function of brightness increase. Where the term "reciprocal" is used herein, it will be appreciated that such other embodiments are also possible. It is possible to adjust the light source intensity in 708, but in some embodiments, the recycling may remain the same (e.g., the percentage of recycling may not be changed by the source reduction, just the absolute value—so as to not put too much illumination onto the modulator). Since light travels fast and even the fastest PWM cycle is comparatively very slow, the recycling may be considered instantaneous and the resulting illumination level may be achieved right after the modulator switches to its current state In the case where the system employs DMD(s) as primary modulators (e.g., modulators which spread out the modulation over several time segments), there may be a modulator state and resulting recycling level for each time segment and each one may be calculated and compensated. For systems that employ DMD(s) as pre-modulators, there may be just one time segment as the system may drive them with a half tone binary pattern—which may only change once per frame (e.g., in practice it may change it 1-4 times per frame, but this may be significantly less than the 10's-100's of time segments for a primary DMD modulator). With embodiments employing LCD and LCoS as primary modulators, these may switch slowly (relative to DMD's) while displaying—so the resulting recycling may be integrated over that time to determine how to compensate.

While the control system/method of FIG. 7A may work in general for any dual/multi-modulator display system, this control may work also in the context of a single modulator projector system (e.g., as might be constructed in the same or similar manner as FIG. 1B). Recycling on the primary modulator may come from the time sequential nature of the DMD, LCoS and LCD based systems.

Figure 8:
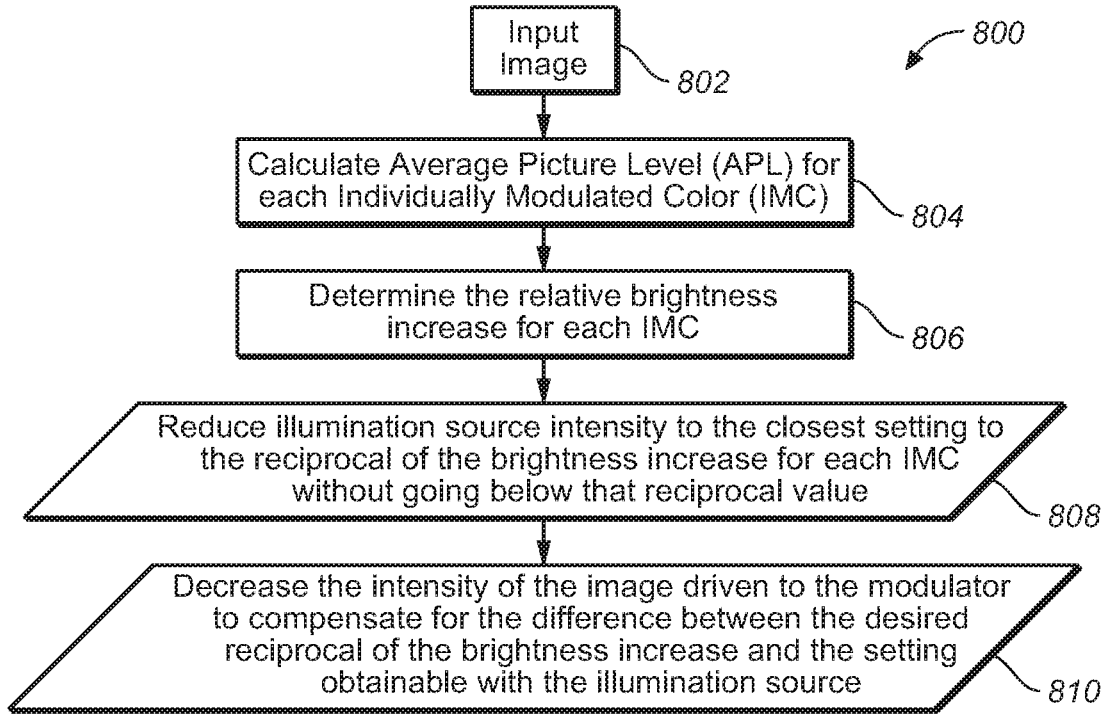
FIG. 8 depicts another possible light recycling control system and/or method for a single modulation projector display system.

FIG. 8 is yet another control system/method (800) for light recycling. Control may start inputting image data at 802. At 804, the system may calculate the APL for each IMC. The system may then determine the relative brightness increase for each IMC at 806. At 808, the system may reduce the illumination source intensity to the closest setting to the reciprocal of the brightness increase for each IMC, possibly without going below that reciprocal value. In one embodiment, it may be assumed that the system may reduce the light with the modulator but not increase it—in such a case, it may not be desired that the system may reduce the illumination source below the required level. However, in another embodiment (e.g., in the case of a mostly dark modulator image), the opposite may tend to be true (e.g., the system may reduce the illumination and then set the modulator to allow more light to pass). In such a case, step 808 may proceed to reduce illumination source intensity to the closest setting to the reciprocal of the brightness increase for each IMC and still allowing for modulator compensation.

The system at 810 may then decrease the intensity of the image driven to the modulator to compensate for the difference between the desired reciprocal of the brightness increase and the setting obtainable with the illumination source. Alternatively, step 810 may also adjust the intensity of the image driven to the modulator to compensate for the difference between the desired reciprocal of the brightness increase and the setting obtainable with the illumination source.

Figures 7C, 9, 10:
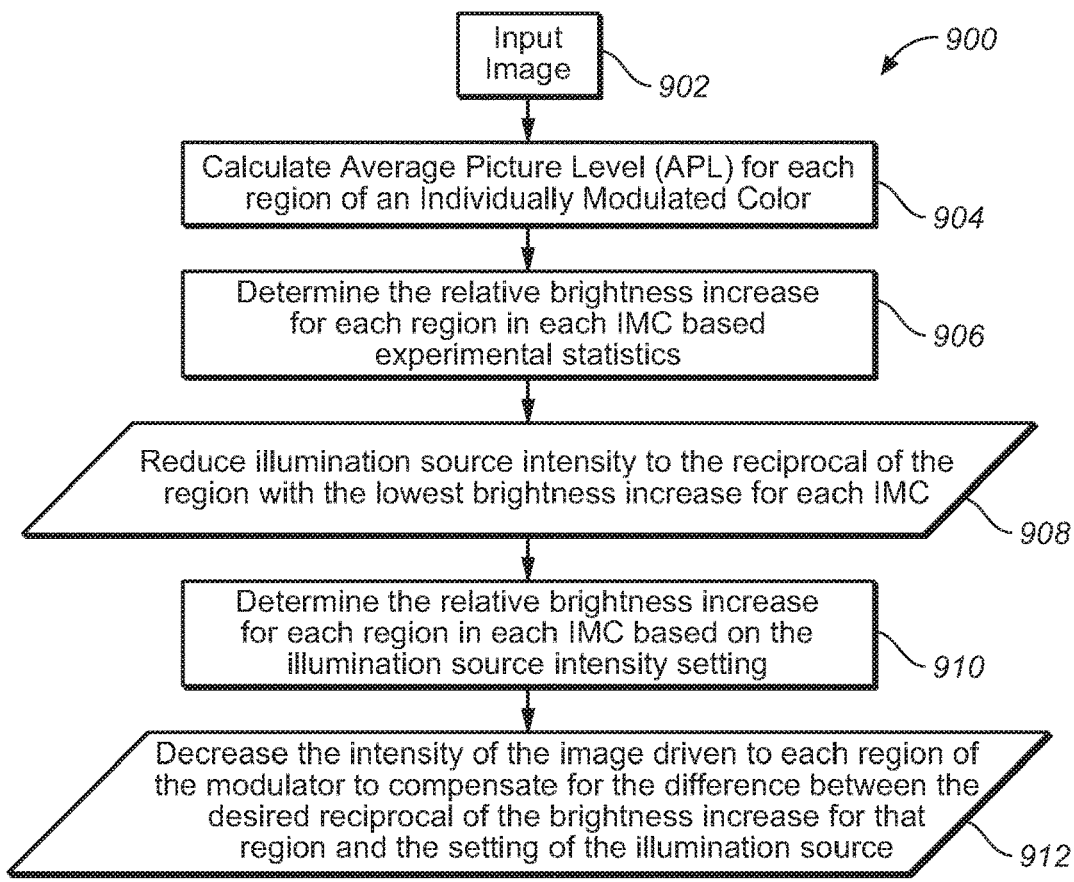
FIG. 9 depicts yet another possible light recycling control system and/or method for a single modulation projector display system.
FIG. 10 depicts one possible response table for a light recycling for a given pattern of illumination

FIG. 9 is yet another embodiment of a control system/method for light recycling. However, this control system/method may work well in display systems where the light non-uniformity due to recycling may need to be considered and/or adjusted, and the illumination intensity control is fine grained or continuous. The system/method 900 may input image data at 902. At 904, the system may calculate APL for each region of an IMC (i.e., where the image may be divided into different regions). At 906, the system may determine the relative brightness increase for each region in each IMC based on experimental statistics. The system may drive patterns (e.g., certain regions off while the rest are on) to the modulator and observe the distribution of light. Depending on the location of the dark region, its recycled light may return to the modulator in a non-uniform fashion. This non-uniformity needs to be compensated for on the modulator.

At 908, the system may reduce illumination source intensity to the reciprocal of the region with the lowest brightness increase for each IMC. The system may determine the relative brightness increase for each region in each IMC, based on the illumination source intensity setting. Then, at 912, the system may decrease the intensity of the image driven to each region of the modulator to compensate for the difference between the desired reciprocal of the brightness increase for that region and the setting of the illumination source.

Given an input image divided into a 5×4 array of image regions, FIG. 10 depicts a partially populated (e.g., the center and corner values are populated only by measurement, estimation and/or calculation—the remainder may be similarly filled) example Table for setting non-uniform levels of light recycling on the modulator given a certain modulator regional pattern (e.g., as derived as part of experimental statistics). In another aspect, it may be possible to show a pattern and then adjust the resulting recycling levels based on its characteristics. For example, Table 1, shows the luminance characteristics of an image segmented into a 3×3 array of image regions (e.g., in each region, it shows whether the average or peak luminance level is above or below a predefined luminance threshold (e.g., 10 nits)). For example, since the bottom right region is OFF (or below the threshold), in an embodiment, as shown in Table 2, most of the light recycling may be performed closer to that area and then drop off for image regions positioned further away. Many such tables, derived by experiment, may be used in 906.

TABLE 1

Luminance characteristics of a test image segmented as a 3 × 3 array of image regions

| ON | ON | ON |
| ON | ON | ON |
| ON | ON | OFF |

TABLE 2

Percent of light recycling for a 3 × 3 segmented image as a function of image characteristics

| 102% | 104% | 108% |
| 103% | 108% | 109% |
| 104% | 108% | 110% |

Figure 11:
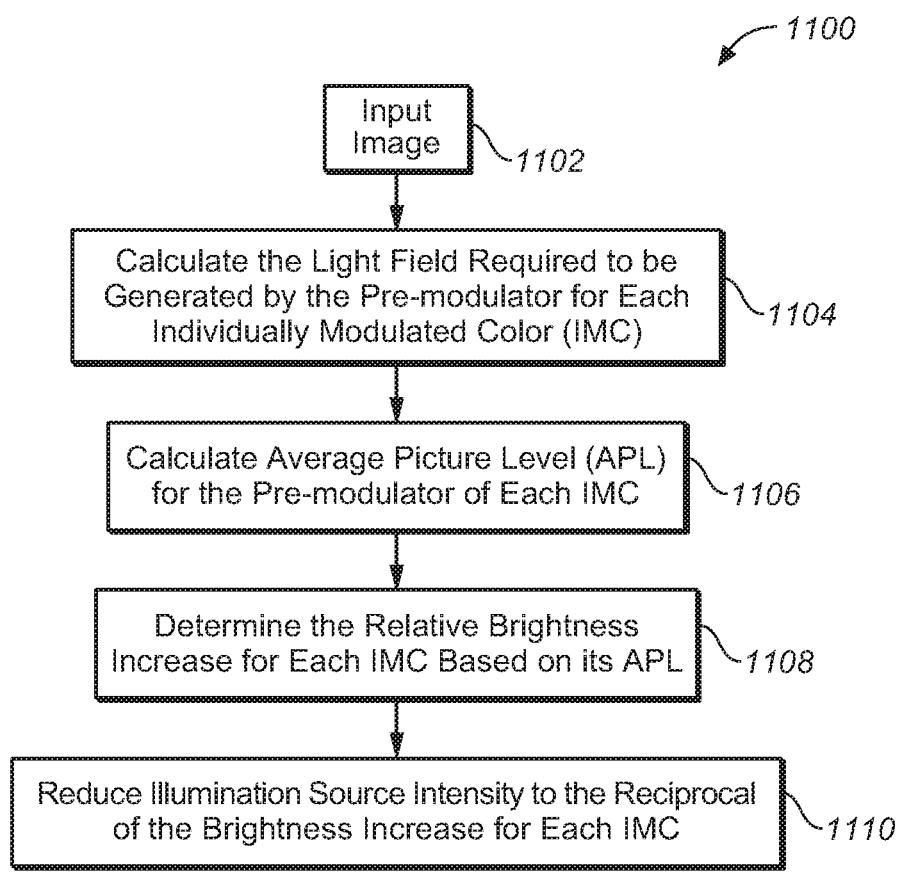
FIGS. 11, 12 and 13 depict three algorithms for effective light recycling in a display system for which light recycling is possible.

FIG. 11 is one embodiment of an algorithm (1100) for reducing illumination source intensity according to brightness increases. Such brightness increases may occur on a individually modulated color basis in some systems.

At 1102, the system may input a desire image for viewing. At 1104, the system may calculated the light field desired (or otherwise required) to be generated by the pre-modulator for each of the individually modulated colors (IMC). At 1106, the system may calculate the average picture level (APL) for the pre-modulator of each IMC. The relative brightness increase may be determined at 1108 for each of the IMCs on its APL. At 1110, the system may then reduce the illumination source intensity to the reciprocal of the brightness increase for each IMC.

Figure 12:
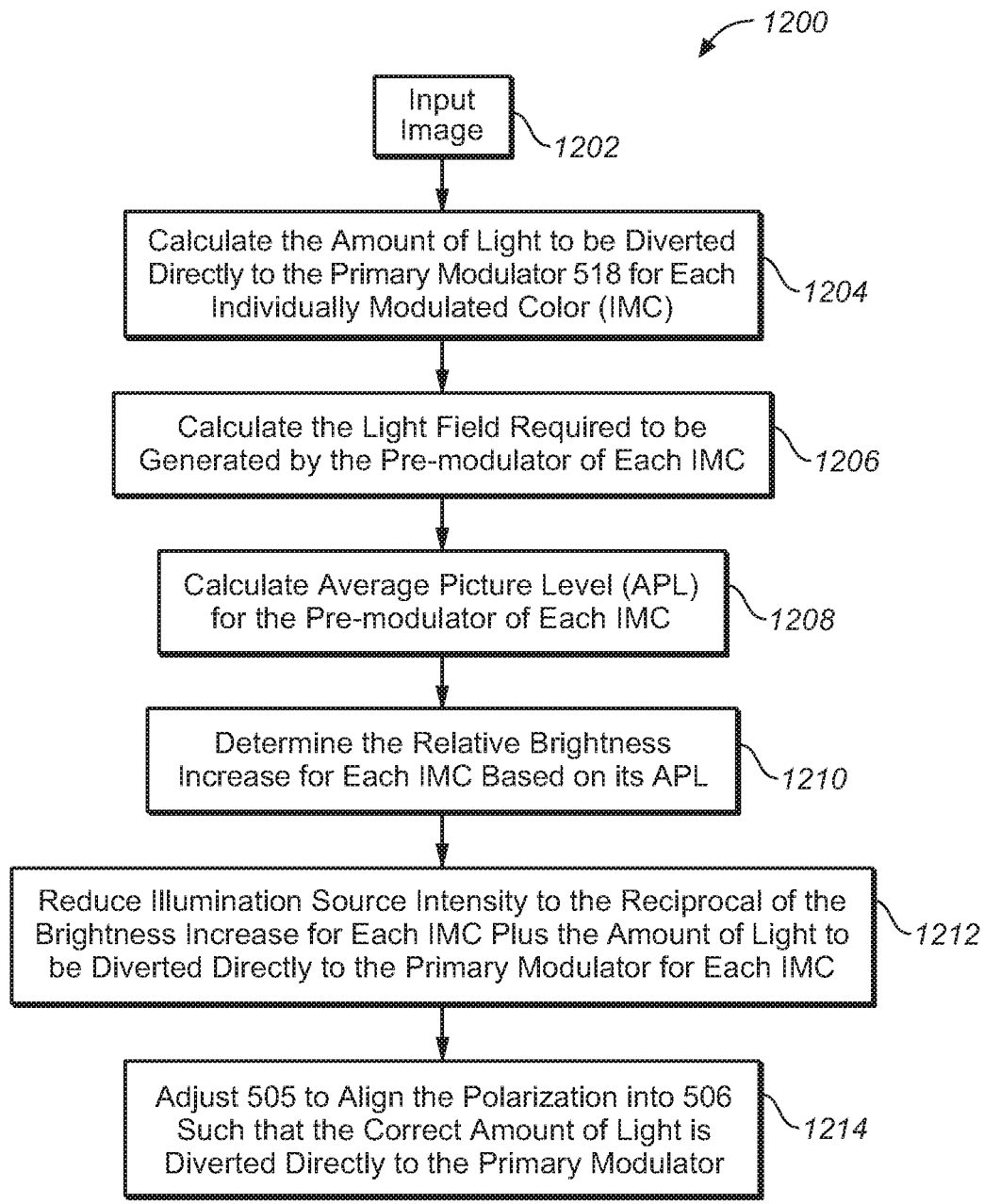

FIG. 12 is one embodiment of an algorithm (1200) for reducing illumination source intensity—especially in systems that may employ polarization to project images—e.g., as may be seen in FIG. 5.

At 1202, the system may input a desired image for viewing. At 1204, the system may calculate the amount of light to be diverted directly to the primary modulator (e.g., such as 514 in FIG. 5), possibly for each of the IMCs. At 1206, the system may then calculate the light field required to be generated by the pre-modulator of each IMC. The APL may then be calculated for the pre-modulator of each IMC at 1208. The system may then determine the relative brightness increase for each IMC based on its APL at 1210. At 1212, the system may reduce the illumination source intensity to the reciprocal of the brightness increase for each IMC. This may also include the amount of light to be diverted directly to the primary modulator for each IMC. At 1214, the system may then adjust the polarizer (e.g., 505) to align the polarization into a beam splitter (e.g., 506) such that a desired amount of light may be diverted directly to the primary modulator.

Figure 13:
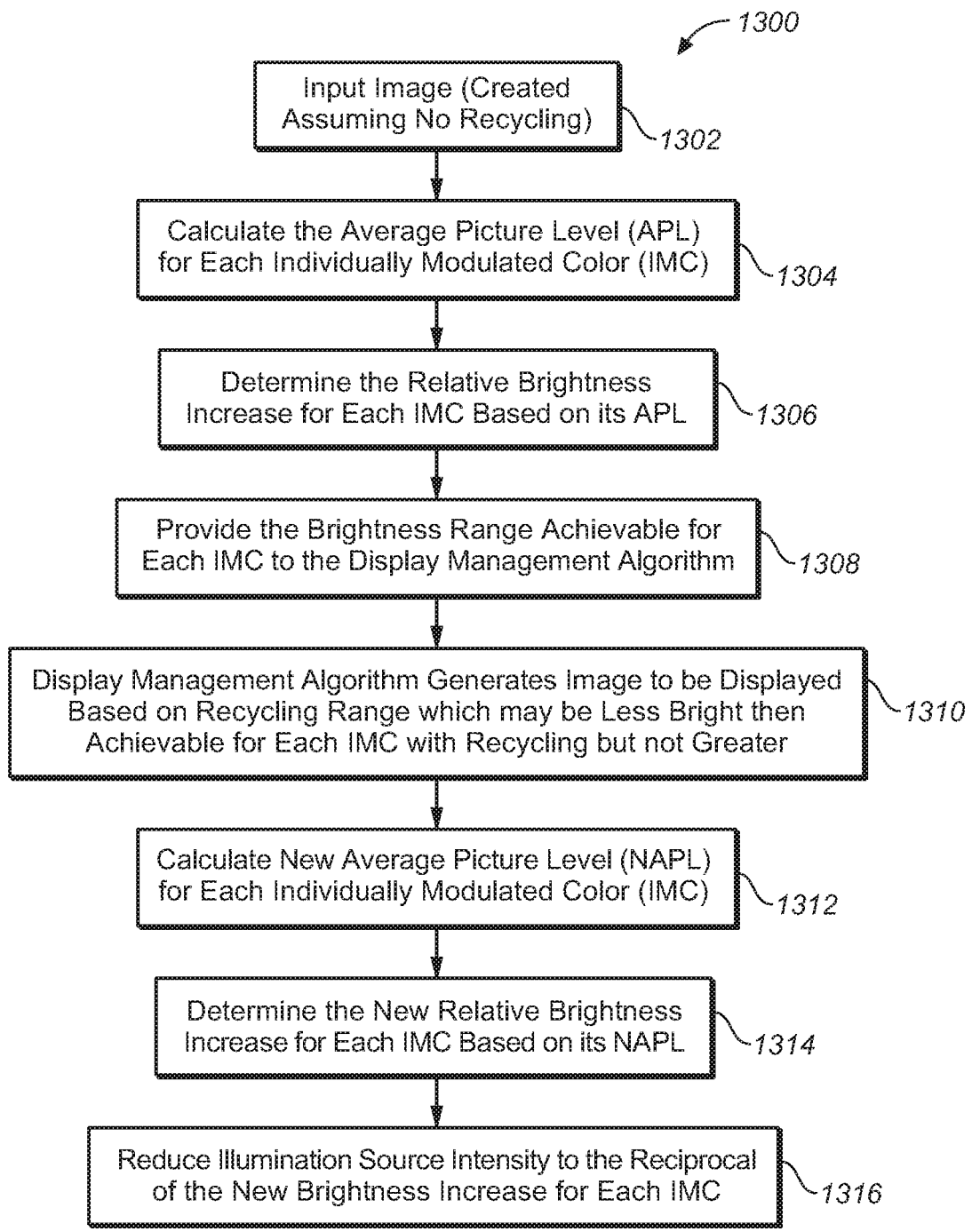

FIG. 13 is one embodiment of an algorithm (1300) that may input images that were generated without the assumption that the display system may engage in light recycling. In one embodiment, the system may adjust for light recycling in many possible ways—e.g., take a "EDR Master" grade and mapping it down to the capabilities of the targeted display while preserving artistic intent by way of metadata.

At 1302, the system may input a desired image for viewing. This image may have been created assuming that no recycling is/was to be accomplished. At 1304, the system may calculate the APL for each IMC. At 1306, the system may determine the relative brightness increase for each IMC based on its APL. The system may then provide (or otherwise calculate) the brightness range that may be achievable for each IMC to the display management algorithm at 1308. At 1310, the display management algorithm may generate an image to be displayed based on a recycling range which may be less bright than achievable for each IMC with recycling—but, possibly, not greater. At 1312, the system may then calculate a New APL (NAPL) for each IMC. At 1314, the system may determine the new relative brightness increase for each IMC based on its NAPL. Thereafter, the system may, at 1316, reduce the illumination source intensity to the reciprocal of the NAPL for each IMC.

Relay Optics for High Dynamic Range Projector Systems

In continued reference to FIG. 14, there is shown a relay optical system 1418 that is placed in between a first modulator 1416 (e.g., a pre-modulator) and a second modulator 1420 (e.g., a primary modulator). Such a relay optical system may be desirable to both reduce the amount of artifacts in the image processing—as well as increasing the contrast of the projected image.

As discussed herein in the context of one embodiment, it may be desirable for the first modulator/pre-modulator to produce a blurred and/or de-focused image based upon image data values, such as the halftone image mentioned herein. In many embodiments, it may be desirable to have a relay optical system that tends to produce a uniformly blurred/de-focused image from the pre-modulator to the primary modulator. In addition, it may be desirable to have a desired, defocused spot shape for this embodiment.

In many embodiments, the relay optical system may comprise lenses or other optical elements that effectively moves the focal plane, corrects for any coma, and adjusts the spread (e.g., by creating defocus/blur and adding spherical aberration to some desired amount).

Figure 15:
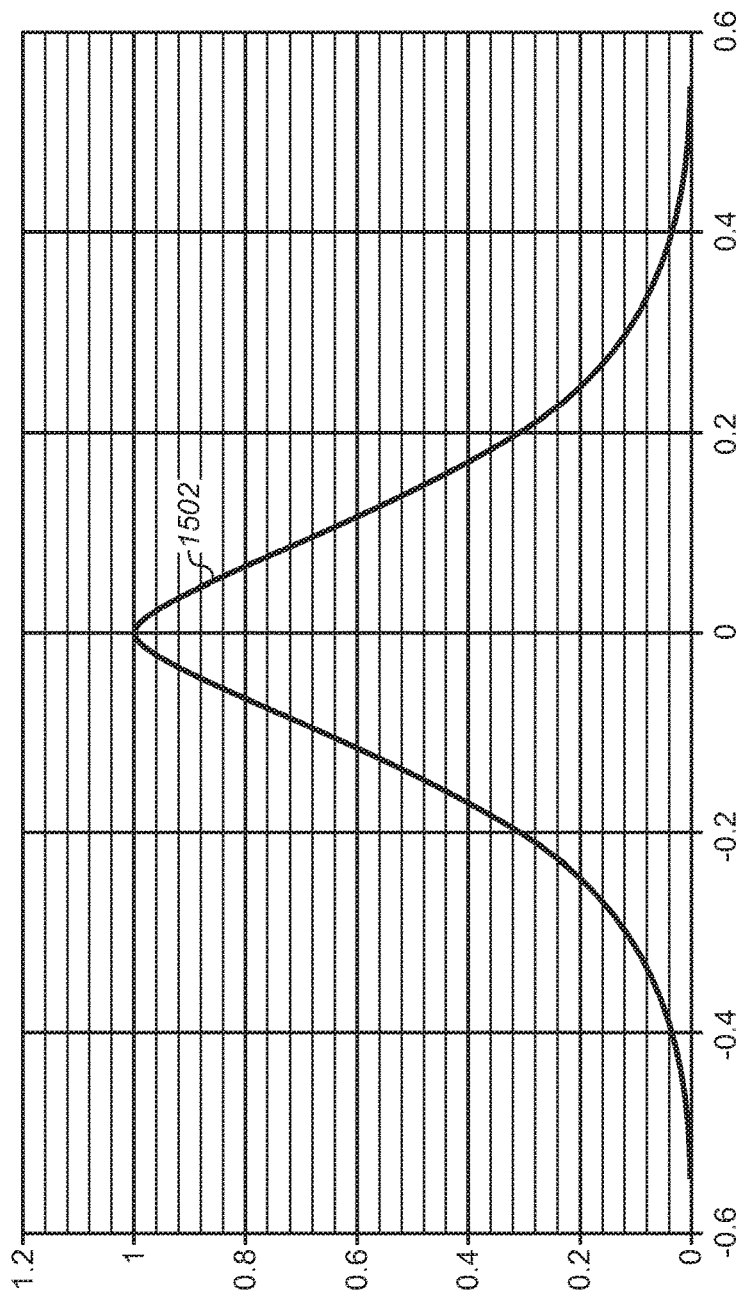
FIG. 15 depicts one possible Gaussian spot shape produced by relay optics as made in accordance with the principles of the present application.

For example, FIG. 15 depicts one possibly desirable spot shape 1502 which is substantially Gaussian-shaped—where the x-axis is distance (in mm) and the y-axis is the relative amount illumination (e.g., where '1' is maximum illumination and '0' is dark). It should be noticed that, in a system that may provide for light recycling or other systems/methods of supplying highlight, the illumination may exceed "1" at some time or another.

Figure 16:
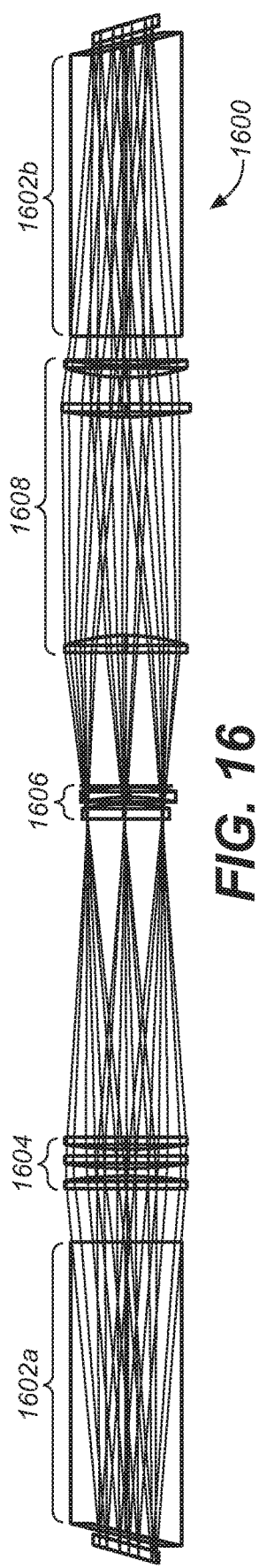
FIG. 16 is another embodiment of a relay optical system as made in accordance with the principles of the present application.

In addition to the optical system 1418 of FIG. 14, FIG. 16 is yet another embodiment of a relay optical system 1600 suitable for the purposes of the present application. On either end of relay optical system 1600, there may be disposed two modulators—e.g., 1602a and 1602b (e.g., as shown here as an unfolded prism systems). First modulator 1602a may be a pre-modulator and second modulator 1602b may be a primary modulator, as mentioned further herein.

Light transmitted by first modulator 1602a may be further transmitted through a focus group of lenses 1604, a coma-correction group of lenses 1606 and a field flattening/spherical aberration-inducing group of lenses 1608—prior to illuminating the second modulator 1602b. In many embodiments, the relay optical system may be substantially telecentric—e.g., wherein the chief rays (that is, oblique rays which pass through the center of the aperture stop) are substantially parallel to the optical axis in front of or behind the system, respectively.

Figure 17:
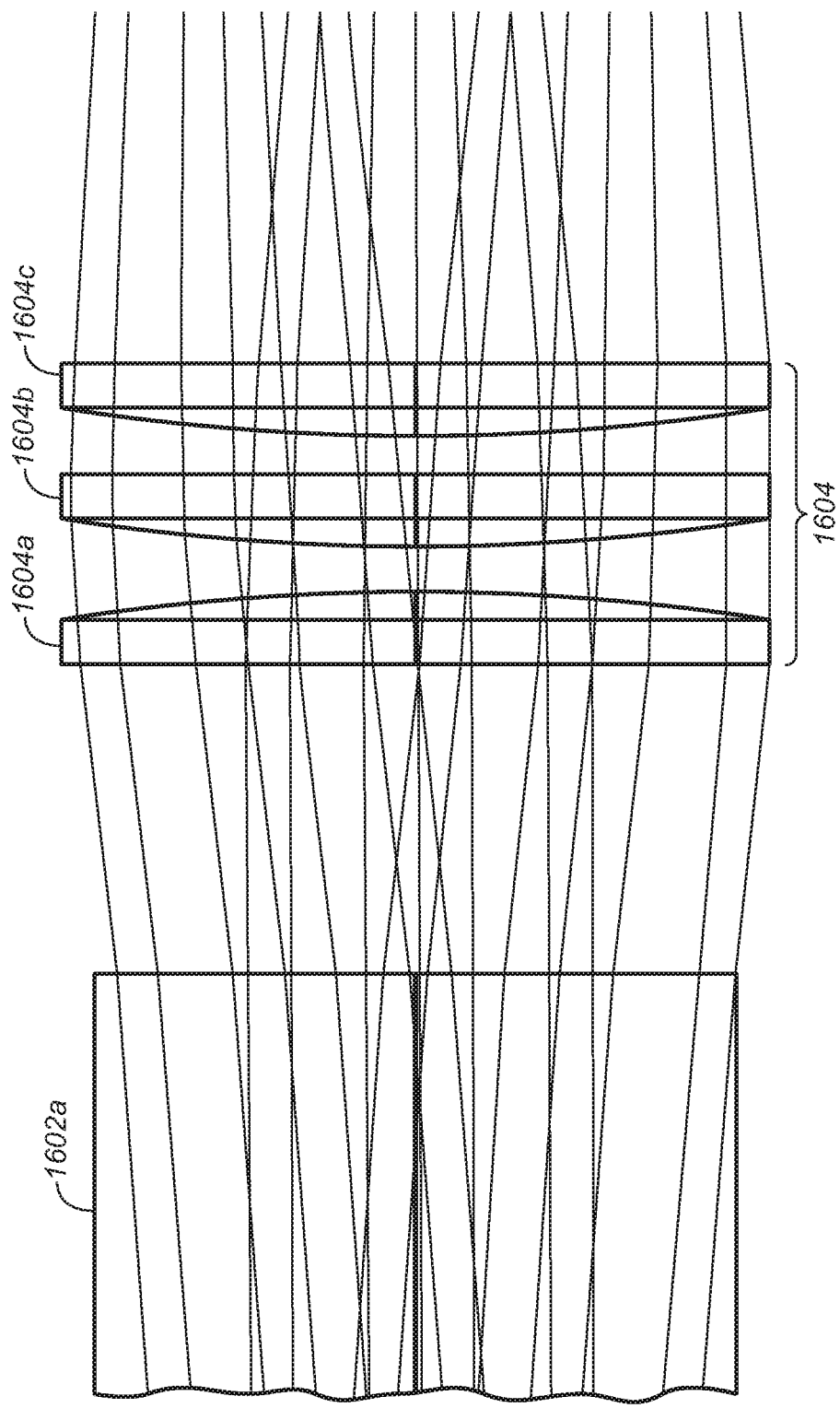
FIG. 17 depicts one embodiment of the focus group of lenses within the relay optical system of FIG. 16.
Figure 18:
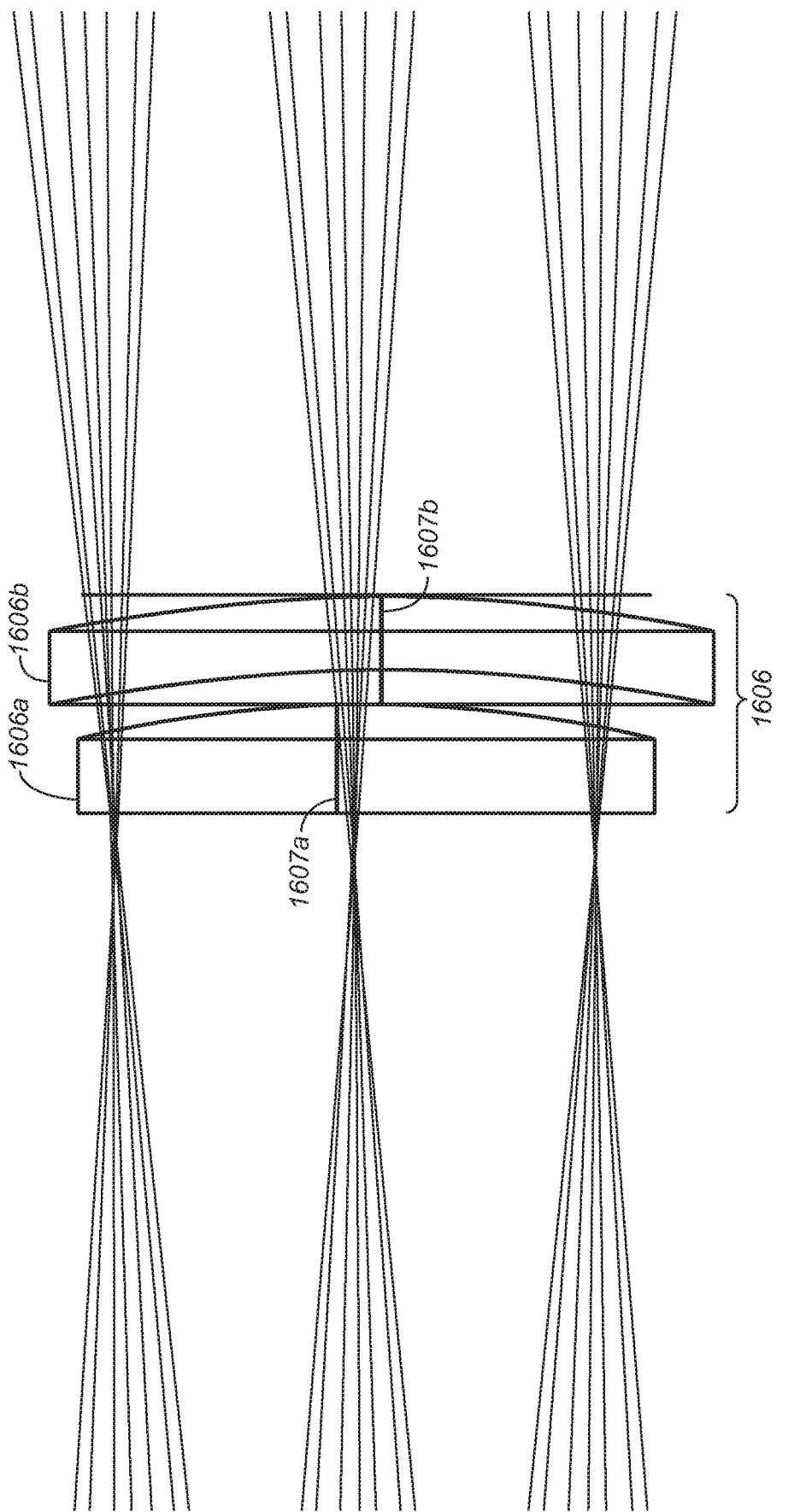
FIG. 18 depicts one embodiment of the coma-correction group of lenses within the relay optical system of FIG. 16.

FIGS. 17 and 18 depict embodiments of the focus group 1604 and the coma-correction group of lenses 1606, respectively. As may be seen in FIG. 17, light from first modulator 1602a is transmitted to focus group 1604. Focus group 1604 may further comprise a first lens 1604a—which may be a plano-convex lens. Lenses 1604b and 1604c may be two lenses comprising plano-convex lenses or lenses comprising a slight meniscus.

Each of these lenses may be designed to have a desired amount of spherical aberration that, in combination with defocus, can yield the proper light distribution (as shown in FIG. 15) at the image plane, where the primary modulator is located. Multiple weak lenses, rather than fewer elements with higher power, will produce the desired amount of spherical aberration more easily. The distances between the lens elements can also contribute to achieving the desired amount of these aberrations.

As mentioned, the amount of blur and/or de-focusing may be set and/or controlled, depending on the distance between lens 1604a and lens 1604b. In one embodiment, a distance and/or air gap of approximately 5-9 mm may be suitable to provide sufficient de-focusing/blurring for illuminating the second modulator. Another embodiment of the focusing group 1604 may affect the ability to change the focus, and thereby adjust the spot size at the primary modulator, by changing the air space between 2 of the elements. In this regard, the adjustable focus with the elements may also tend to create the desired spherical aberration.

In one embodiment, the projector system may set this distance one time at the time of manufacture and the lenses may be set on a permanent mount for the working lifetime of the projector system. In another embodiment, the distance may be dynamically varied during the course of operation. In such an embodiment, one or more of the lenses may be moveably mounted in the relay optical system wherein the distance may be adjusted as desired according to a controller providing control signals to the moveable mount.

FIG. 18 depicts that light from the focus group 1604 is transmitted to a coma correcting group 1606. As in several embodiments of the present projection system, the fact that light is transmitted between two modulators that may comprise optical elements that are tilted with respect to one another (e.g., the two modulators comprising a plurality of prisms or the like), this may tend to induce a certain amount of coma and/or stigmatism into the transmitted light. Thus, in many embodiments, coma-correcting group 1606 may be placed into the optical path to correct for this coma and/or stigmatism. One manner of correcting coma/stigmatism may be achieved by off-setting the optical axis 1607a in the first lens 1606a with respect to the optical axis 1607b in the second lens 1606b by a desired amount, as may be seen in FIG. 18. In one embodiment, both lenses 1606a and 1606b may be slight meniscuses—e.g., where the surface proximal to the light path is slight concave and the surface distal to the light path is slight convex. It may be possible that one or both may be plano-convex lenses.

In addition, the coma-correcting group 1606 may be designed to provide color correction in the light—e.g., so that the projector system may employ multiple color light (e.g., red, green and blue) in such a manner as to provide uniform magnification and avoid the use of any additional corrective optical elements. If the positive element is made from crown glass with low dispersion, and the negative element of the group 1606 is made from a flint glass with high dispersion, then the glasses and element shape can be selected such that all light wavelengths are focused nearly the same at the primary modulator. This feature also can provide for the same magnification for each color, so that in a 3-color projector, the optical system of FIG. 16 can be made the same for each color's light path.

Light from the coma-correcting group 1606 may be transmitted to field flattening/spherical aberration inducing group 1608. Group 1608 may be employed to provide additional spherical aberration to provide additional defocusing/blurring to the Point Spread Function (PSF—e.g., substantially Gaussian) for the light transmitted to the second modulator.

In some embodiments, it may be possible to have relay optics system that may have one, two or three functional groups for different arrangements. For example, one relay optical system may comprise a focus group, a coma-correcting group and/or a spherical aberration inducing group in different combinations.

Relay Optical System for Projector Systems Employing Light Recycling

Figure 19:
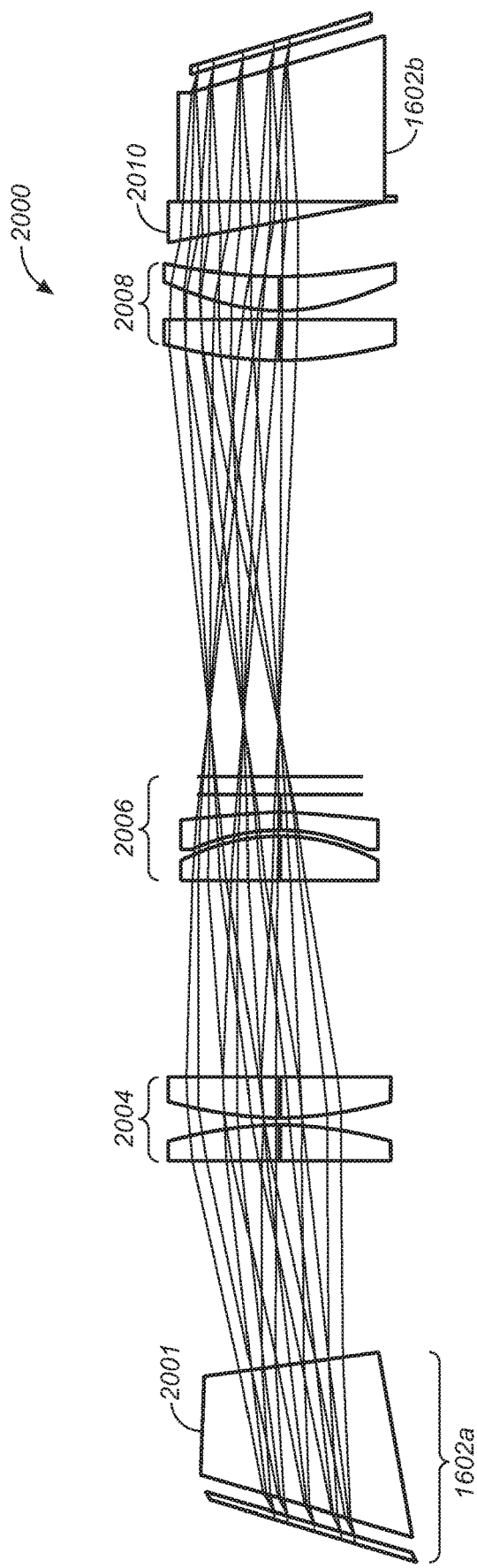
FIG. 19 depicts one embodiment of a relay optical system that may be suitable for projector systems that may perform light recycling.

In projector systems that employ light recycling systems as discussed herein, FIG. 19 shows one possible embodiment that comprises a first modulator 1602a, a second modulator 1602b and a relay optical system that may comprise a focus group 2004, a coma-correcting group 2006, and a spherical aberration inducing group 2008. The focus group 2004 and the coma-correcting group 2006 and the spherical aberration inducing group 2008 may function and be set substantially the same as discussed above in the case without light recycling.

However, in a system that employs light recycling, it may be desirable that the light from the first modulator 1602a has a different angle of incidence to the light path coming into the relay optical system (as is depicted by the light transmitted from surface 2001 of 1602a). To correct for this angle of incidence, a prism 2010 may be placed at the proximal side of the second modulator 1602b. This may be so because the light exiting the object (premodulator 1602a) is substantially at an angle of incidence of 36 degrees relative to the premodulator 1602a (in this case referenced as the chief ray angle), and the light arrives at the primary modulator 1602b at 24 degrees angle-of-incidence. This may tend to cause a loss of symmetry in the optical path that is not seen in the non-recycling case. The light path (both glass and air) to be traveled by light from all corners of the object plane to the image plane may be desired to be substantially the same. Where the image plane is found to be tilted relative to the primary modulator 1602b, a wedge of glass 2010 may be added to one or more of the prisms in the optical path, the shape of such wedge to be determined by optimizing the design taking into consideration the focus group 2004, coma group 2006, and aberration group 2008.

Figure 20:
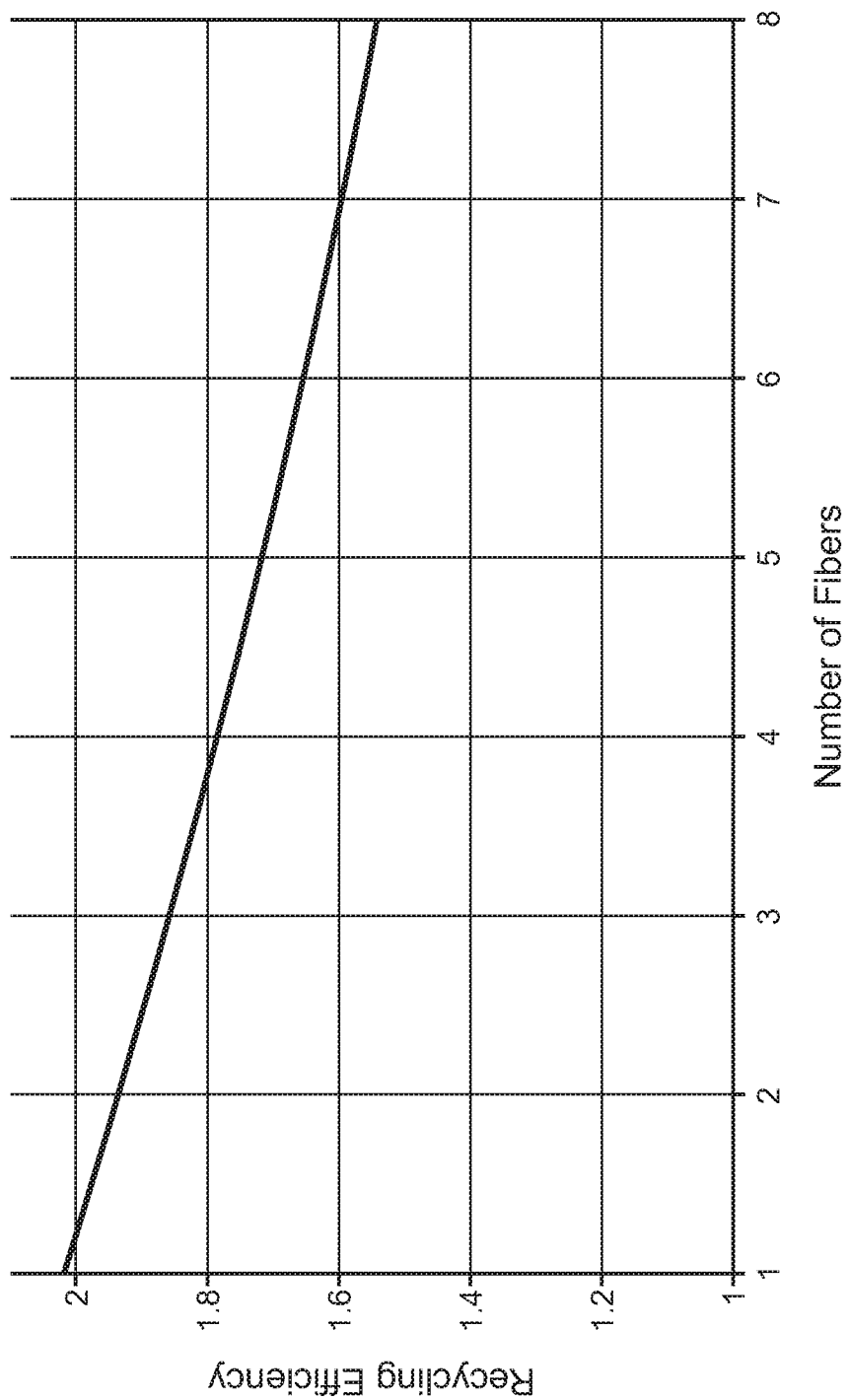
FIG. 20 depicts an exemplary plot of number of fibers vs. recycling efficiency for putative projector display systems.

FIG. 20 depicts the etendue of the light source—e.g., if there are multiple fibers that are illuminating the optical path. For example, in FIG. 14, there may be more than one light fiber providing illumination. Light that can be delivered into a small spot or a single optical fiber may be preferable to light that is delivered in a large spot or multiple optical fibers. FIG. 20 shows the potential trade-off in recycling efficiency. It may be desirable to provide the maximum possible area of the input face of the integrating rod to be covered by reflector rather than port.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method for controlling a projector display system, the display system further comprising a light source, the light source comprising a plurality of individually modulated color emitters; an integrating rod, said integrating rod configured to receive light from said light source at a proximal end and wherein said proximal end comprising a reflective surface, configured to reflect light to be recycled down said integrating rod; a relay optical system, said relay optical system further comprising optical elements that are configured to move the focal plane of the projector display system; a first modulator, said first modulator comprising a plurality of moveable mirrors, said plurality of moveable mirrors configured to reflect recycled light received from said integrating rod; a second modulator, said second modulator configured to modulate light received from said first modulator and transmitting said modulated light for projection; and a controller for controlling at least the light source, the first modulator and the second modulator, the steps of the method comprising:

receiving an input image;

calculating an average picture level for each individually modulated color in a desired region of the input image;

determining a brightness increase for each individually modulated color in the desired region based on its respective average picture level; and reducing an illumination source intensity to the reciprocal of the brightness increase for each individually modulated color.

2. The method as recited in claim 1 further comprising: reducing the illumination source intensity to the reciprocal of the brightness increase for each individually modulated color further comprises reducing the illumination source intensity to the closest setting to the reciprocal of the brightness increase for each individual modulated color without going below the reciprocal value.

3. The method as recited in claim 2 further comprising: decreasing the intensity of the image driven to the modulator to compensate for the difference between the desired reciprocal of the brightness increase and the setting obtainable with the illumination source.

4. The method as recited in claim 1 wherein the step of determining the brightness increase for each individually modulated color in the desired region further comprises:

determining the brightness increase for each individually modulated color in the desired region based on experimental statistics.

5. The method as recited in claim 4 wherein the step of reducing the illumination source intensity to the reciprocal of the brightness increase for each individually modulated color further comprises:

reducing the illumination source intensity to the reciprocal of the region with the lowest brightness increase for each individually modulated color.

6. The method as recited in claim 5 further comprising: determining the brightness increase for each region in each individually modulated color based on the illumination source intensity setting.

7. The method as recited in claim 6 further comprising: decreasing the intensity of image driven to each region to compensate for the difference between the desired reciprocal of the brightness increase for that region and the setting of the illumination source.

8. The method as recited in claim 1 wherein the input image was created assuming that no light recycling was to be performed, the method further comprising:

providing the brightness range achievable for each individually modulated color to the controller;

generating an image to be displayed based on the recycling range which may be less bright than achievable for each individually modulated color with recycling;

calculating a new average picture level for each individually modulated color; and determining a new brightness increase for each individually modulated color based on the new average picture level.

9. The method as recited in claim 8 further comprising: reducing the illumination source intensity to the reciprocal of the new brightness increase for each individually modulated color.

10. The method as recited in claim 8 further comprising: adjusting the polarizer to align the polarization into the beam splitter such that the desired amount of light is diverted directly to the first modulator.

11. A method for controlling a projector display system, the display system further comprising a light source, the light source comprising a plurality of individually modulated color emitters; an integrating rod, said integrating rod configured to receive light at a proximal end and wherein said proximal end comprising a reflective surface, configured to reflect light to be recycled down said integrating rod; a polarizer, the polarizer receiving light from the light source; a beam splitter, the beam splitter receiving polarized light from the polarizer; a first modulator, said first modulator comprising a plurality of moveable mirrors and receiving some portion of the light from the beam splitter; a beam combiner, the beam combiner receiving light from the beam splitter and the first modulator; and a second modulator, said second modulator configured to modulate light received from the beam combiner and transmitting said modulated light for projection, the steps of the method comprising:

receiving an input image;

calculating the amount of light to be diverted directly to the second modulator for each individually modulated color;

calculating the light field to be generated by the first modulator for each individually modulated color;

calculating the average picture level for the first modulator for each individually modulated color;

determining a brightness increase for each individually modulated color based on its respective average picture level; and reducing an illumination source intensity to the reciprocal of the brightness increase for each individually modulated color plus the amount of light to be diverted directly to the first modulator for each individually modulated color.

12. A projector display system configured to recycle light from a light source, said projector display system comprising:

a light source, the light source comprising a plurality of individually modulated color emitters;

an integrating rod, said integrating rod configured to receive light from said light source at a proximal end and wherein said proximal end comprising a reflective surface, configured to reflect light down said integrating rod;

a relay optical system, said relay optical system further comprising optical elements that are configured to move the focal plane of the projector display system; and a first modulator, said first modulator comprising a plurality of moveable mirrors, said plurality of moveable mirrors configured to reflect light received from said integrating rod in at least one of a first projection direction and a light recycling direction wherein said light recycling direction is substantially in the direction of the integrating rod;

a second modulator, said second modulator configured to modulate light received from said first modulator in the first projection direction and transmitting said modulated light for projection; and a controller for controlling the first modulator and the second modulator, the controller reading machine readable instructions that, when read, causes the controller to perform the following:

receiving an input image;

calculating an average picture level for each individually modulated color in a desired region of the input image;

determining a brightness increase for each individually modulated color in the desired region based on its respective average picture level; and reducing an illumination source intensity to the reciprocal of the brightness increase for each individually modulated color.

13. The projector display system as recited in claim 12 wherein the controller further performs:

reducing the illumination source intensity to the reciprocal of the brightness increase for each individually modulated color further comprises reducing the illumination source intensity to the closest setting to the reciprocal of the brightness increase for each individual modulated color without going below the reciprocal value.

14. The projector display system as recited in claim 13 wherein the controller further performs:

decreasing the intensity of the image driven to the modulator to compensate for the difference between the desired reciprocal of the brightness increase and the setting obtainable with the illumination source.

15. The projector display system as recited in claim 12 wherein the controller further performs:

determining the brightness increase for each individually modulated color in the desired region based on experimental statistics.

16. The projector display system as recited in claim 15 wherein the controller further performs:

reducing the illumination source intensity to the reciprocal of the region with the lowest brightness increase for each individually modulated color.

17. The projector display system as recited in claim 16 wherein the controller further performs:

determining the brightness increase for each region in each individually modulated color based on the illumination source intensity setting.

18. The projector display system as recited in claim 17 wherein the controller further performs:

decreasing the intensity of image driven to each region to compensate for the difference between the desired reciprocal of the brightness increase for that region and the setting of the illumination source.

19. The projector display system as recited in claim 12 wherein the input image was created assuming that no light recycling was to be performed, the controller further performing:

providing the brightness range achievable for each individually modulated color to the controller;

generating an image to be displayed based on the recycling range which may be less bright than achievable for each individually modulated color with recycling;

calculating a new average picture level for each individually modulated color; and determining a new brightness increase for each individually modulated color based on the new average picture level.

20. The projector display system as recited in claim 19 wherein the controller further performs:

reducing the illumination source intensity to the reciprocal of the new brightness increase for each individually modulated color.

* * * * *